US006195319B1

(12) United States Patent
Ohshita et al.

(10) Patent No.: US 6,195,319 B1
(45) Date of Patent: Feb. 27, 2001

(54) OPTICAL PICKUP POSITION CONTROL DEVICE

(75) Inventors: Akihiro Ohshita; Terufumi Hino, both of Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/154,701

(22) Filed: Sep. 17, 1998

(30) Foreign Application Priority Data

Dec. 26, 1997 (JP) .................................................. 9-361264

(51) Int. Cl.$^7$ ....................................................... G11B 7/09
(52) U.S. Cl. ..................................... 369/44.35; 369/44.29; 369/44.34
(58) Field of Search ........................... 369/44.29, 44.35, 369/44.36, 44.34, 44.41, 54, 44.25

(56) References Cited

U.S. PATENT DOCUMENTS

| 5,258,968 | * | 11/1993 | Matsuda et al. | 369/44.35 |
| 5,347,503 | | 9/1994 | Koyama et al. | |
| 5,351,224 | | 9/1994 | Nagata et al. | |
| 5,612,939 | * | 3/1997 | Ueki et al. | 369/54 |
| 5,633,846 | * | 5/1997 | Okuyama et al. | 369/44.35 |
| 5,703,848 | * | 12/1997 | Hofer | 369/44.29 |
| 5,926,445 | * | 7/1999 | Sasaki et al. | 369/44.35 |
| 6,011,762 | * | 1/2000 | Watanabe et al. | 369/44.25 |
| 6,118,739 | * | 9/2000 | Kishinami et al. | 369/44.28 |

FOREIGN PATENT DOCUMENTS

| 0 392 561 A2 | 10/1990 | (EP) . |
| 0 718 832 A1 | 6/1996 | (EP) . |
| 0 745 981 A2 | 12/1996 | (EP) . |
| 0 831 467 A2 | 3/1998 | (EP) . |
| 5-151590 | 6/1993 | (JP) . |
| 5-151592 | 6/1993 | (JP) . |
| 5-217315 | 8/1993 | (JP) . |

* cited by examiner

Primary Examiner—Thang V. Tran
(74) Attorney, Agent, or Firm—Nixon & Vanderhye, P.C.

(57) ABSTRACT

An optical pickup position control device according to the present invention automatically adjusts tracking with precision and in a short time. Two deviation signals, which express deviation of a light beam, projected by a pickup which uses the three-beam method, from a target track of a disk, are digitized by two AD converters. Two high-pass filters extract from the deviation signals AC signals, producing a tracking error signal. Further, two low-pass filters extract from the deviation signals DC signals (offset components). Two other low-pass filters extract from the deviation signals low-band signals containing DC components. Using the various foregoing signals, a control circuit calculates correction values to be applied to two offset correcting circuits and to two gain/balance correcting circuits, and corrections are performed collectively and simultaneously on the basis of these correction values.

38 Claims, 8 Drawing Sheets

OPTICAL PICKUP POSITION CONTROL DEVICE

FIELD OF THE INVENTION

The present invention relates to an optical pickup position control device to be used in, for example, an optical recording and reproducing device, and, more specifically, relates to an optical pickup position control device which automatically performs, with precision and in a short time, adjustment of offset, etc. of a deviation signal expressing misalignment of a light spot, formed by the optical pickup on the surface of a disk, with a track centerline or focusing point of the disk.

BACKGROUND OF THE INVENTION

Devices, such as compact disk devices and minidisk devices, which optically reproduce (or record) data are provided with an optical pickup, which projects laser light onto a disk, and receives light reflected therefrom. In such devices, the position of the optical pickup with respect to the disk is generally controlled by means of tracking control and focus control. As is commonly known, tracking control is control which causes the light projected by the optical pickup to correctly follow a target track on the disk, and focus control is control which adjusts the focus position of the laser light in order to form on the target track a light spot of a predetermined diameter (i.e., a focused light spot).

Conventional devices for performing this kind of control include, for example, those disclosed in Japanese Unexamined Patent Publication Nos. 5-217315/1993 (Tokukaihei 5-217315; hereinafter "Document 1"), 5-151592/1993 (Tokukaihei 5-151592; hereinafter "Document 2"), and 5-151590/1993 (Tokukaihei 5-151590/1993; hereinafter "Document 3").

In Document 1, gain of a focus servo loop or of a tracking servo loop (servo computing section) are adjusted automatically with each servo loop in a closed state. In Document 1, a signal of a predetermined frequency, produced by an oscillator (VCO), is applied to the servo loops. Further, by means of a band-pass filter, a signal of a certain frequency is extracted from the output of the servo computing section, and this extracted signal is multiplied with the signal from the oscillator. From the resulting signal, unneeded frequency components are eliminated using a notch filter, and gain is adjusted according to the output value of the notch filter.

In order to determine the state of a servo loop quickly and simply, it is most effective to apply, as above, an external signal to the servo loop. Accordingly, almost all disk devices including an automatic adjustment structure which are now on the market adopt the method of applying an external signal. For this reason, there are many cases in which the external signal producer and the various filters function solely as members for automatic adjustment, and are not used during normal reproducing. Further, since adjustment of the servo loop can only be performed with the servo loop in a closed state, it becomes necessary to repeat the operations of closing and opening the servo loop for each adjustment.

In Document 2, with the tracking servo loop in an open state, the pickup is moved a predetermined time or a distance necessary to cross a predetermined number of tracks. At this time, track deviation signals, which express an amount of deviation from the centerline of the target track, are measured from each side of the track, and a tracking error signal, which is a difference between these two deviation signals, is outputted. Then, by adjusting the gain of one of a pair of variable gain amplifiers through which the two track deviation signals are sent, so that a mean value of the tracking error signals approaches zero, the gain of the other variable gain amplifier is controlled in accordance with this adjustment. When tracking balance has been attained by repeating this gain adjustment until the mean value is zero, the gain control value at this time is stored in storage means (a memory).

In adjusting the balance, the gain of one of the variable gain amplifiers is adjusted, and a comparator determines whether the mean value of the tracking error signals is a value within a predetermined range. If it is determined that the mean value is outside the predetermined range, gain is again adjusted, and gain adjustment must be repeated until the mean value falls within the predetermined range.

In a focus control device according to Document 3, when not receiving the light beam reflected from the memory medium, two signals from position detecting means are measured, and, using these measured values, an offset correction quantity is set. With this method, offset arising in the circuit is corrected in a state free of influence from reflected light and stray light. In order to avoid the influence of gain and balance adjustment, this offset adjustment is performed prior to gain and balance adjustment.

After offset has been corrected, the position detecting means are returned to a state in which they can receive the light beam reflected from the memory medium, and gain adjustment is performed. In gain and balance correction, after adjusting one of the foregoing two signals, fine tuning of a control target position is performed. In fine tuning, gain correction quantity is roughly set so that the maximum amplitudes of the two signals from the position detecting means are equal. Then, when rough adjustment of focus has substantially been completed, gain correction quantity is further varied within a certain range, and the intensity of reflected light from the light projected onto the track is detected. At this time, as shown in FIG. 9, gain and balance correction quantities are set so that the intensity of the reflected light is maximum.

Incidentally, the present invention is chiefly directed toward tracking adjustment, but it may also be directed toward focus adjustment. Accordingly, the focus adjustment method of Document 3, which may also be applied to tracking adjustment, has been discussed above as prior art.

In typical optical pickup position control devices, as seen in Document 1, in performing tracking gain adjustment, an external signal is generally applied to the servo loop. This adjustment is naturally only possible when the servo loop is in a closed state. For this reason, control of external signal application, servo opening and closing, etc. becomes complicated. Further, since an external signal unnecessary in normal servo loop operations is applied, the servo system naturally becomes unstable, and the reliability of adjustment is impaired.

Moreover, since it is necessary to provide means for producing the external signal to be applied to the servo loop during tracking gain adjustment, and to perform complex switching of filters, etc. in order to extract the external signal, circuit structure and circuit processing are complicated. Further, if the S/N ratio of the signal to be reproduced has not yet been adjusted, passing the output of the servo computing section through the filters, etc. does not generally improve the S/N ratio, and the gain may not be correctly adjusted. There is also the drawback that adjustment using an external signal takes time. Furthermore, since gain adjustment is performed with the external signal inputted, unlike a case without input of an external signal, gain is adjusted in a somewhat different state due to the influence of each external signal. This accordingly leads to the drawback that tracking gain cannot be adjusted with the optimum value.

With the tracking balance adjustment of Document 2, in order to easily obtain a tracking error signal, the optical head is forcibly moved. Further, by repeatedly increasing and decreasing the gain of a variable gain amplifier with the tracking error signal passing through a low-pass filter, gain is adjusted so that the average value of the tracking error signal is zero. With this adjustment method, since various steps are repeated, the time needed for adjustment is lengthened. Again, the time needed for adjustment is also lengthened by the time required to move the optical head to the predetermined position.

With Document 3 relating to focus control, in order to avoid influence from the optical system by adjusting offset of the focus when the light beam is not projected, a structure for opening and closing the optical path is necessary, and the structure of the device is complicated. Moreover, since only the offset in the circuit is corrected, a drawback is that offset due to stray light cannot be corrected.

Further, since one of the two signals from the position detecting means is corrected using the other signal as a standard, if the standard signal is not a suitable value, the other signal cannot be corrected accurately. This necessitates an operation for adjusting the standard signal to a suitable value. Again, even if the standard signal is a suitable value, it is necessary to confirm whether the other signal has been influenced by the foregoing adjustment, which requires a large amount of time.

Further, in performing focus control, adjustment of offset outside of the optical system (i.e., in the circuit system) is first performed, and then, with the light beam projected, rough adjustment of gain and balance, and finally fine tuning for optimization of the gain correction quantity are performed. Since, with regard to gain/balance, gain correction quantity is set in two stages, control is complicated, with the result that setting the gain correction quantity requires a large amount of time. Moreover, in setting by fine tuning, gain is gradually varied and the maximum value of the reflected light found by repeating operation routines for setting, measurement, storage, comparison, etc., and the gain control quantity at that time is then found. Thus the time necessary for adjustment is necessarily lengthened. In order to obtain the maximum value of the reflected light, in practice, at least two focus position changes and at least three light intensity measurements are necessary, and, in normal use, there are probably many cases in which even more changes and measurements are required.

As discussed above, the prior art in the foregoing three documents has various problems. Further, Document 1 discusses gain adjustment, Document 2 balance adjustment, and Document 3 offset correction and balance adjustment, but with the prior art in these documents, offset correction, gain adjustment, and balance adjustment cannot be performed collectively. In other words, the prior art in each of the foregoing documents has its particular problems, and adjustment must be carried out in steps by performing each of the various steps in turn.

SUMMARY OF THE INVENTION

It is an object of the present invention to provide an optical pickup position control device able to perform adjustment of tracking and focus with precision and in a short time, and, specifically, to provide an optical pickup position control device able to increase the precision of and greatly decrease the amount of time required in offset correction, balance correction, and gain correction by performing these respective corrections collectively (although offset correction may be performed separately).

In order to attain the foregoing object, a first optical pickup position control device according to the present invention, for an optical pickup which optically performs at least one of recording a signal in a track on a disk and reproducing a signal from a track on the disk, includes a servo circuit which performs (a) position control which causes light projected by the optical pickup to follow a target track such that the light substantially follows the centerline of the track, and (b) position control which adjusts a focus position of light projected by the optical pickup such that the light is substantially focused on the disk;

a digitizer, which digitizes two deviation signals, outputted from the optical pickup, which express a quantity of deviation of the optical pickup from a target position which is the object of at least one of the position control (a) and the position control (b);

a difference signal producing section, which, based on the digitized deviation signals, produces a difference signal between the two deviation signals;

a correction value calculating section, which, based on the digitized deviation signals, calculates a balance correction value to be applied to the two deviation signals in order to correct balance therebetween; or, based on the digitized deviation signals, the difference signal obtained from the two deviation signals, and a previously set standard value unique to the position control device, calculates a gain correction value to be applied to the two deviation signals in order to correct gain of the deviation signals in the servo circuit; and a correcting section, which corrects balance based on the balance correction value, or corrects gain based on the gain correction value.

In the first position control device, the correction value calculating section calculates a balance correction value or a gain correction value, and the correcting section corrects balance or gain. Accordingly, operations for adjustment of correction are unnecessary, and correction can be made in a short time. Specifically, since a standard value unique to the position control device is used in calculating the gain correction value for gain correction, calculating an appropriate gain correction value does not require processing such as setting, measurement, storing, comparison, etc. Further, since the balance correction value or gain correction value is applied to both deviation signals, appropriate adjustment of one of the deviation signals is not necessary, as it is when one deviation signal is corrected using the other deviation signal as a standard. Moreover, processing is performed using digital signals, and thus calculation of each correction value can be performed at high speed and using a simple structure. Accordingly, balance or gain can be corrected in a short time and with high precision, and the structure for performing this correction can be simplified.

In order to attain the foregoing object, a second optical pickup position control device according to the present invention, for an optical pickup which optically performs at least one of recording a signal in a track on a disk and reproducing a signal from a track on the disk, includes: a tracking servo circuit for performing tracking adjustment, based on two deviation signals corresponding to quantities of deviation from a centerline of a track toward either side thereof and a difference signal between the two deviation signals, such that light projected by the optical pickup follows the track;

a digitizer, which digitizes the two deviation signals;

a correction value calculating section, which, based on the digitized deviation signals, calculates an offset correction value for correcting offset of the deviation signals and a balance correction value for correcting balance between the deviation signals; and, based on the digitized deviation signals, the difference signal obtained from the two deviation signals, and a previously set standard value unique to the position control device, calculates a gain correction value for correcting gain of the deviation signals in the tracking servo circuit; and a correcting section which, based on the correction values, simultaneously corrects offset, balance, and gain.

In the second position control device, the correction value calculating section calculates each correction value for tracking control, and the correcting section simultaneously corrects offset, balance, and gain. Accordingly, correction can be performed in a shorter time than in the first position control device. Moreover, since a standard value unique to the position control device is used in calculating the gain correction value for gain correction, calculating an appropriate gain correction value does not require processing such as setting, measurement, storing, comparison, etc. Further, processing is performed using digital signals, and thus calculation of each correction value can be performed at high speed and using a simple structure. Accordingly, offset, balance, and gain can be corrected in a short time and with high precision, and the structure for performing these corrections can be simplified.

In order to attain the foregoing object, a third optical pickup position control device according to the present invention, for an optical pickup which optically performs at least one of recording a signal in a track on a disk and reproducing a signal from a track on the disk, includes a tracking servo circuit for performing tracking adjustment, based on two deviation signals corresponding to a quantity of deviation from a centerline of a track toward either side thereof and a difference signal between the two deviation signals, such that light projected by the optical pickup follows the track;

a digitizer, which digitizes the two deviation signals;

a correction value calculating section, which, based on a comparison between the digitized deviation signals, calculates an offset correction value for correcting offset of the deviation signals and a balance correction value for correcting balance between the deviation signals; and a correcting section which, based on the correction values, simultaneously corrects offset and balance.

In the third position control device, in tracking control, the correction value calculating section calculates both correction values, and the correcting section simultaneously corrects offset and balance. Accordingly, operations for adjustment of correction are unnecessary, and correction can be made in a short time. Further, processing is performed using digital signals, and thus calculation of each correction value can be performed at high speed and using a simple structure. Accordingly, offset and balance can be corrected in a short time and with high precision, and the structure for performing these corrections can be simplified.

In order to attain the foregoing object, a fourth optical pickup position control device according to the present invention, for an optical pickup which optically performs at least one of recording a signal in a track on a disk and reproducing a signal from a track on the disk, includes: a tracking servo circuit for performing tracking adjustment, based on two deviation signals corresponding to quantities of deviation from a centerline of a track towards either side thereof and a difference signal between the two deviation signals, such that light projected by the optical pickup follows the track;

a digitizer, which digitizes the two deviation signals;

a difference signal producing section, which, based on the digitized deviation signals, produces a difference signal between the two deviation signals; and a threshold value setting section, which sets a threshold value, used for determining a timing with which light from the optical pickup crosses a track, in accordance with direct-current levels of the digitized deviation signals.

In the fourth position control device, even if the direct-current levels of the deviation signals fluctuate, the basis for determining the threshold value also fluctuates in accordance with the fluctuations in the direct-current levels of the deviation signals, and thus unevenness in determination of timing can be eliminated. Further, processing is performed using digital signals, and thus calculation of each correction value can be performed at high speed and using a simple structure. Accordingly, a period for setting the level of the difference signal can be set correctly, and the structure for performing this setting can be simplified.

Additional objects, features, and strengths of the present invention will be made clear by the description below. Further, the advantages of the present invention will be evident from the following explanation in reference to the drawings.

DESCRIPTION OF THE EMBODIMENTS

The following will explain one embodiment of the present invention with reference to FIGS. 1 through 8.

Figure 1:
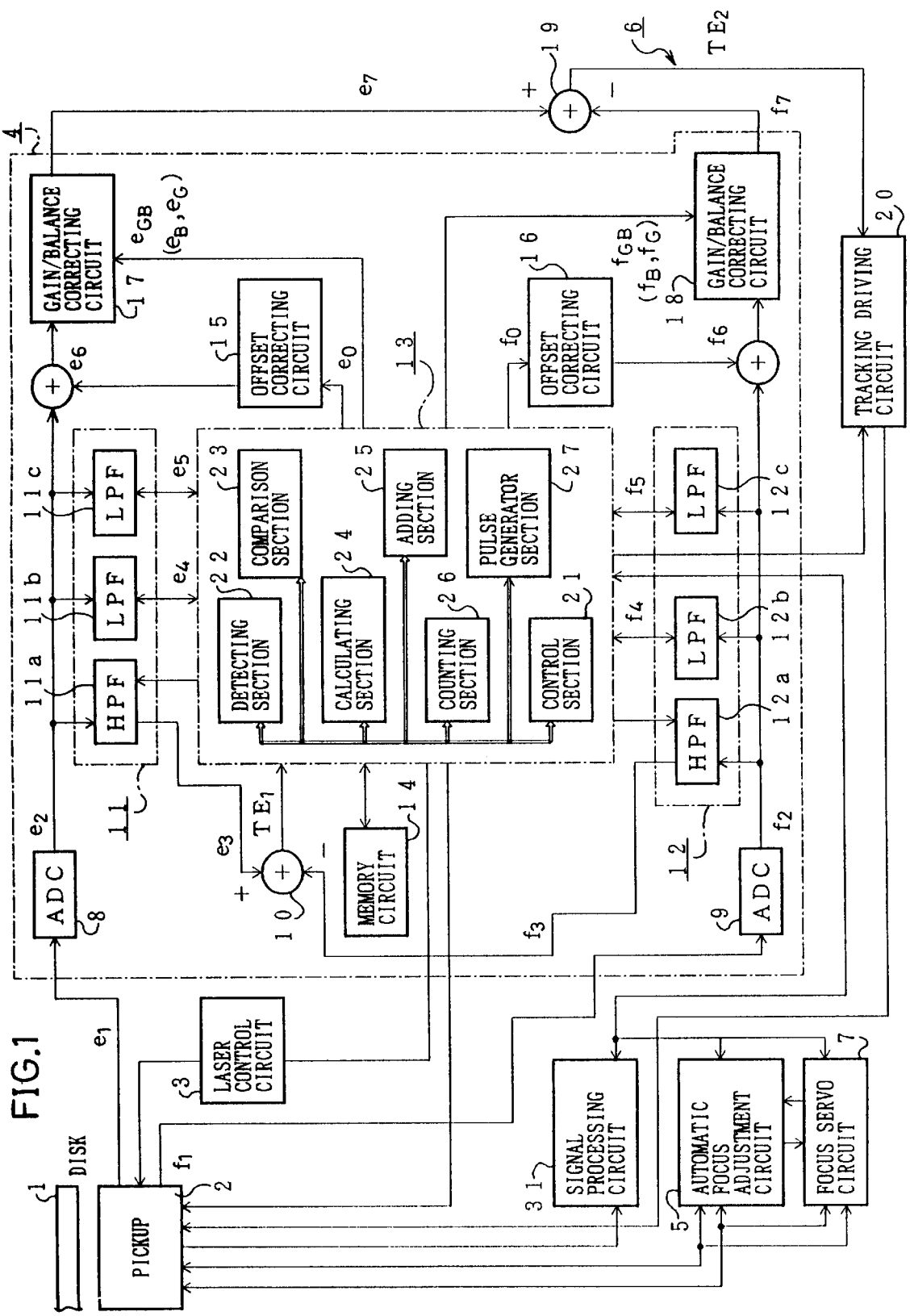
FIG. 1 is a block diagram showing the structure of the chief sections, including an optical pickup position control device, of an optical disk device according to one embodiment of the present invention.
Figure 2:
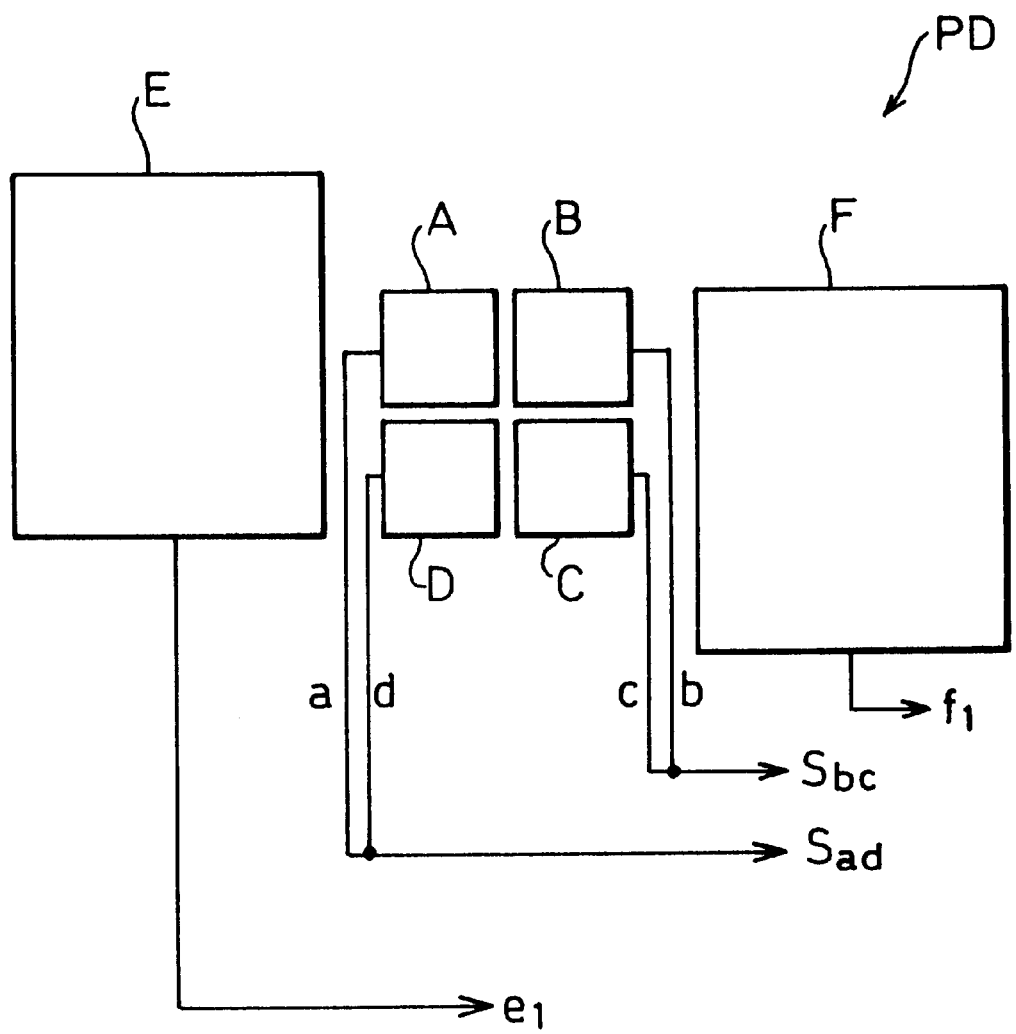
FIG. 2 is a plan view showing the structure of a photo-detector provided in the pickup of the foregoing optical disk device.

FIG. 1 is a block diagram showing the overall structure of an optical disk device which includes an optical pickup position control device (hereinafter referred to simply as the "position control device").

The present optical disk device includes a pickup 2 (optical pickup), a laser control circuit 3, a signal processing circuit 31, and the position control device.

The pickup 2 projects laser light for recording and reproducing onto a disk 1. As the disk 1 to be recorded and/or reproduced by the pickup 2, a CD (compact disk), MD (mini-disk; recording/reproducing or reproducing only), DVD (digital video disk), etc., may be used.

Further, the pickup 2, in order to reproduce a data signal recorded in the disk 1, receives laser light reflected from the disk 1 (reflected light), and outputs a photodetection signal. This photodetection signal is sent to a signal processing circuit 31, an automatic tracking adjustment circuit 4, an automatic focus adjustment circuit 5, a pickup driving circuit (a tracking servo circuit 6 and a focus servo circuit 7), etc.

Further, the pickup 2 uses the three-beam method for tracking error detection, and is provided with an optical system (not shown) which projects a main beam and two subsidiary beams, and with a photodetector PD (shown in FIG. 2) which detects reflected light from the disk 1. The photodetector PD is provided with photoreceptor sections A through F.

The main beam is received by the four photoreceptor sections A through D, and photodetection signals outputted by the photoreceptor sections A through D are sent to the signal processing circuit 31. The subsidiary beams are received by the photoreceptor sections E and F, provided on each side of the photoreceptor sections A through D, and photodetection signals outputted by the photoreceptor sections E and F, i.e., track deviation signals (hereinafter referred to simply as "deviation signals") $e_1$ and $f_1$, are sent to the automatic tracking adjustment circuit 4 and the tracking servo circuit 6.

As is commonly known, the deviation signals $e_1$ and $f_1$ are signals which correspond to a distance between the center of the beam spot formed on the disk 1 by the laser light and the centerline of the track to be followed by the beam spot. The deviation signals $e_1$ and $f_1$ are processed along two systems of signal paths, as will be discussed below.

Further, from photodetection signals a through d, outputted by the photoreceptor sections A through D, respectively, of the photodetector PD, the pickup 2 calculates a sum signal $S_{ad}$ by adding the photodetection signals a and d, and calculates a sum signal $S_{bc}$ by adding the photodetection signals b and c. These sum signals $S_{ad}$ and $S_{bc}$ are sent to the automatic focus adjustment circuit 5 and the focus servo circuit 7.

Incidentally, the present embodiment explains an example in which tracking is automatically adjusted using the deviation signals $e_1$ and $f_1$, but obtaining track deviation signals by means of a method other than the three-beam method (by the push-pull method, for example) accords with the main intent of the present invention.

Further, the structure for automatic focus adjustment, which includes the automatic focus adjustment circuit 5 and the focus servo circuit 7, is basically the same as the structure for automatic tracking adjustment which will be discussed below, and accordingly drawings and explanation of the details thereof will be omitted. The automatic focus adjustment structure corresponds to the automatic tracking adjustment structure as follows. A focus error output circuit and a focus driving circuit, both included in the focus servo circuit 7, correspond to a tracking error output circuit 19 and a tracking driving circuit 20, and a focus error signal producing circuit, which is included in the automatic focus adjustment circuit 5, corresponds to a tracking error signal producing circuit 10. Further, the sum signals $S_{ad}$ and $S_{bc}$ are used instead of the deviation signals $e_1$ and $f_1$. Accordingly, a focus error signal (difference signal) is produced as the difference between the sum signals $S_{ad}$ and $S_{bc}$.

By means of the foregoing structure, automatic focus adjustment is performed according to operations substantially equivalent to those of the automatic tracking adjustment to be discussed below, and accordingly, detailed explanation thereof will be omitted. Further, since balance adjustment of focus is chiefly adjustment in the mechanical structure, with almost no adjustment in the circuit, it may be omitted.

The laser control circuit 3 is a circuit which controls laser output of the pickup 2. The signal processing circuit 31 is a circuit which reproduces the data signal (a+b+c+d) by performing predetermined processing such as error correction, demodulation, etc.

The position control device includes the automatic tracking adjustment circuit (hereinafter referred to as the "automatic adjustment circuit") 4 and the tracking servo circuit 6, and performs tracking control of the pickup 2.

With the disk 1 inserted in the present optical disk device, but prior to reproducing, the automatic adjustment circuit 4 automatically determines offset, gain, and balance correction quantities for the deviation signals $e_1$ and $f_1$, and, based on the correction quantity values, corrects offset, gain, and balance. The automatic adjustment circuit 4 includes AD converters 8 and 9 (ADCs), the tracking error signal producing circuit 10, filter units 11 and 12, a control circuit 13, a memory circuit 14, offset correcting circuits 15 and 16, and gain/balance correcting circuits 17 and 18.

The AD converters 8 and 9 (digitizing means) digitize the deviation signals $e_1$ and $f_1$, and output digital deviation signals $e_2$ and $f_2$. The deviation signals $e_2$ and $f_2$ are sent to the tracking error signal producing circuit 10, the control circuit 13, and the gain/balance correcting circuits 17 and 18.

The control circuit 13, as will be discussed below, is structured such that it determines each correction quantity by performing predetermined calculations based on the results of various measurements, and, based on the correction quantities obtained, sends commands to the various foregoing members. The memory circuit 14 is made up of, for example, an EEPROM (Electrically Erasable Programmable ROM), and stores various previously set initial correction values and data necessary for the calculations (to be discussed below) performed by the control circuit 13, and also stores correction values, etc. determined by the control circuit 13. When the disk 1 is placed in the present optical disk device, the initial correction values are set, and are then revised to correction values determined by the control circuit 13 for the inserted optical disk 1. When a different disk 1 is inserted, the revised correction values are reset to the initial correction values, which are then revised to correction values determined for the different disk 1.

The offset correcting circuits 15 and 16 (correcting means), based on an offset correction value calculated by the control circuit 13, correct offset of the deviation signals $e_2$ and $f_2$ from the AD converters 8 and 9, respectively. Each of the gain/balance correcting circuits 17 and 18 (correcting means) is made up of a circuit such as a variable gain amplifier, and is a kind of amplifier (or attenuator) which, based on a gain/balance correction value calculated by the control circuit 13, corrects gain/balance of corrected deviation signals $e_6$ and $f_6$, which have undergone offset correction.

The tracking servo circuit 6, on the other hand, is structured as a loop circuit made up of the pickup 2, the AD converters 8 and 9, the gain/balance correcting circuits 17 and 18, the tracking error output circuit 19, and the tracking driving circuit 20. In the tracking servo circuit 6, the two tracking deviation signals $e_1$ and $f_1$ from the pickup 2 pass through parallel signal paths made up of the AD converters 8 and 9 and the gain/balance correcting circuits 17 and 18, and are then synthesized into one signal by the tracking error output circuit 19, thus producing a difference signal (a tracking error signal $TE_2$) which is the difference between the two signals. This difference signal passes through the tracking driving circuit 20 and returns to the pickup 2.

The tracking driving circuit 20 contains a DA converter (not shown) for outputting an analog control signal to be provided to the pickup 2.

The filter unit 11 includes a high-pass filter 11*a* (HPF) and low-pass filters 11*b* and 11*c* (LPFs), and the filter unit 12 includes a high-pass filter 12*a* (HPF) and low-pass filters 12*b* and 12*c* (LPFs). Each filter unit 11 and 12 is made up of a kind of digital filter which uses a DSP (Digital Signal Processor).

This kind of digital filter can switch the cutoff frequency by varying the filter coefficient, and thus each filter unit 11 and 12 functions as both high-pass filter (11*a*/12*a*) and low-pass filter (11*b* and 11*c*/12*b* and 12*c*). By combining the various filters into units, the number of members is reduced, and this contributes to reduction of the cost of the present optical disk device and to simplification of operations in the assembly and adjustment process.

Incidentally, the two filter units 11 and 12 may be structured as a single filter unit. Again, each filter may be structured as an independent filter rather than in the two filter units 11 and 12.

The high-pass filters 11*a* and 12*a* cut out low-range components, specifically, DC components of the deviation signals $e_2$ and $f_2$, thereby extracting AC signals $e_3$ and $f_3$, which are the AC components. The tracking error signal producing circuit 10 produces and sends to the control circuit 13 a tracking error signal $TE_1$, which is a difference signal between the two AC signals $e_3$ and $f_3$: ($e_3-f_3$).

The high-pass filters 11*a* and 12*a* are provided in order to eliminate the DC components, which cause problems in determining, as will be discussed below, the length of one period of the tracking error signal $TE_1$ at the time of measuring the peak-to-peak value of the tracking error signal $TE_1$ in order to determine the gain correction quantity. The filter coefficients of the low-pass filters are set such that the low-pass filters 11*b* and 12*b* are used during offset correction, and the low-pass filters 11*c* and 12*c* are used during gain/balance correction.

Offset arising due to stray light and offset arising in the electrical circuit are for the most part DC components. Accordingly, the low-pass filters 11*b* and 12*b* are provided to extract DC signals $e_4$ and $f_4$, which are offset components of the electrical circuit, and which include the influence of the optical system. The cutoff frequencies of the low-pass filters 11*b* and 12*b* are set very low.

When detecting the levels of the deviation signals $e_1$ and $f_1$, if the deviation signals $e_2$ and $f_2$ include an AC component of fairly low frequency (100 Hz or lower), by setting the cutoff frequencies of the low-pass filters 11*c* and 12*c* slightly higher than those of the low-pass filters 11*b* and 12*b*, the levels can be detected more accurately than when the deviation signals $e_2$ and $f_2$ are only DC components. In this way, in order to increase the precision of level detecting, it is preferable to set the cutoff frequencies of the low-pass filters 11*c* and 12*c* slightly higher than those of the low-pass filters 11*b* and 12*b*.

However, when this accuracy is not taken into consideration, the cutoff frequencies of the low-pass filters 11*b*, 12*b*, 11*c*, and 12*c* may be the same value. In this case, it is possible to combine the low-pass filters 11*b* and 12*b* for offset correction and the low-pass filters 11*c* and 12*c* for gain/balance correction.

Each of the pairs of the high-pass filters 11*a* and 12*a*, the low-pass filters 11*b* and 12*b*, and the low-pass filters 11*c* and 12*c* may be provided as a single filter, and the cutoff frequency switched according whether to offset correction or gain/balance correction is being performed. Again, in products (optical disk devices) with very small offset correction, it is sufficient if a single low-pass filter is provided for each of the deviation signals $e_2$ and $f_2$.

The control circuit 13 includes a control section 21, a detecting section 22, a comparison section 23, a calculating section 24, an adding section 25, a counting section 26, etc. The control section 21 includes a processor such as a CPU, and a circuit for computation processing, which includes the detecting section 22, the comparison section 23, the calculating section 24, the adding section 25, the counting section 26, etc., is made up of the foregoing DSP.

The control section 21 gives commands including the following, and sends control signals to the tracking driving circuit 20, etc.

(1) Commands for switching from the low-pass filters 11*b* and 12*b* for offset correction to the low-pass filters 11*c* and 12*c* for gain/balance correction, and vice versa;

(2) Commands for changing the filter coefficients of the high-pass filters 11*a* and 12*a*;

(3) Communications commands for the memory circuit 14;

(4) Commands for input of correction values to the offset correction circuits 15 and 16 and the gain/balance correction circuits 17 and 18;

(5) Operating commands for the various sections in the control circuit 13, such as the detecting section 22, the comparison section 23, the calculating section 24, the adding section 25, the counting section 26, etc.; and (6) Laser output ON/OFF commands (light projection shutoff means) to be sent to the laser control circuit 3.

Here, it is important that the present optical disk device is structured such that, during normal reproducing operations, even if the DC signals $e_4$ and $f_4$, the low-band signals $e_5$ and $f_5$, and the tracking error signal $TE_1$ are inputted into the control circuit 13, only the tracking servo circuit 6 is closed, and the operations of the automatic adjustment circuit 4 do not influence the tracking servo circuit 6. In order to accomplish this, the control section 21 alone is put in an operating state, and the control section 21 performs one of the following operations: (a) putting the sections 22 through 26 of the control circuit 13 in a non-operating state; or (b) prohibiting output of correction values to the offset correcting circuits 15 and 16 and the gain/balance correcting circuits 17 and 18, thereby blocking the correction value output lines.

Operations like the foregoing can be realized by digitizing the deviation signals $e_1$ and $f_1$ in the AD converters 8 and 9. In other words, in order to allow the offset correcting circuits 15 and 16 and the gain/balance correcting circuits 17 and 18 to perform correction using digital signals, signal processing in the tracking servo circuit 6 is performed digitally. Thus, correction values, which are the results of digital processing in the control circuit 13, can be directly transmitted to the offset correcting circuits 15 and 16 and the gain/balance correcting circuits 17 and 18, but it is also simple not to transmit the correction values, as above.

Further, none of the various sections 22 through 26 of the control section 13 is devoted solely to performance of a certain adjustment operation, and, by using the memory circuit 14 to change the set value of each section 22 through 26 during each adjustment operation, the sections 22 through 26 can be used in common for all of the adjustment operations. For this reason, the adjustment operations can be processed collectively, which enables reduction of the number of members, and reduction of the size and weight of the position control device.

In the control circuit 13, the detecting section 22 detects levels of the DC signals $e_4$ and $f_4$, the low-band signals $e_5$ and $f_5$, and the tracking error signal $TE_1$. The comparison section 23 performs comparison of a stored value read, as necessary, from the memory circuit 14 and a detected value from the detecting section 22, and the calculating section 24, based on the result of that comparison, performs predetermined calculations to find offset correction and gain/balance correction values. The steps for determining the offset correction value and the gain/balance correction value will be explained in detail later. The counting section 26, as will be discussed below, counts a number of level detections of the low-band signals $e_5$ and $f_5$, etc.

Here, automatic adjustment processing by the automatic adjustment circuit 4 will be explained.

In automatic adjustment, first, with laser light projection turned OFF, offset correction is performed, and then, with laser light projection turned ON, gain/balance correction is performed. Control of laser light projection is performed by the control circuit 13 by sending an ON/OFF command to the laser control circuit 3.

In offset correction, when offset correction values $e_0$ and $f_0$ have been determined by the control circuit 13, offset correction values previously stored in the offset correcting circuits 15 and 16 are revised to the offset correction values $e_0$ and $f_0$, respectively, by means of a command from the control circuit 13. Then, the deviation signal $e_2$ is converted to a corrected deviation signal $e_6$ ($e_6=e_2+e_0$), and the deviation signal $f_2$ is converted to a corrected deviation signal $f_6$ ($f_6=f_2+f_0$).

In gain/balance correction, when gain/balance correction values $e_{GB}$ and $f_{GB}$ have been determined by the control circuit 13, gain/balance correction values previously stored in the gain/balance correcting circuits 17 and 18 are revised to the gain/balance correction values $e_{GB}$ and $f_{GB}$, respectively, by means of a command from the control circuit 13. Then, the deviation signal $e_6$ is converted to a corrected deviation signal $e_7$ ($e_7=e_6 \times e_{GB}$), and the deviation signal $f_6$ is converted to a corrected deviation signal $f_7$ ($f_7=f_6 \times f_{GB}$).

In reproducing, the tracking error output circuit 19 outputs the tracking error signal $TE_2$, which is a difference signal between the corrected deviation signals $e_7$ and $f_7$. The tracking driving circuit 20 is put in readiness for operation upon receiving a control signal from the control circuit 13. Thus, the present optical disk device performs normal reproducing operations using the tracking error signal $TE_2$.

Next, the operations of the automatic adjustment circuit 4 will be explained with reference to the flow-charts in FIGS. 3 through 8.

First, the operations of the automatic adjustment circuit 4 will be explained in outline with reference to FIG. 3.

First, after commencement of automatic tracking adjustment, the tracking offset correction value is calculated and stored in the memory circuit 14 (step S1), and tracking offset is corrected using that offset correction value (step S2). Next, balance correction values $e_B$ and $f_B$ are calculated and stored in the memory circuit 14 (step S3). Then, based on the low-band signals $e_5$ and $f_5$, a count level is set (step S4), which is a standard level for detecting a track crossing point for the tracking error signal $TE_1$. This is necessary in detecting the level of the tracking error signal $TE_1$. Processing in step S4 will be explained in detail later.

Next, the tracking error signal $TE_1$ is produced (step S5), and the level of the tracking error signal $TE_1$ is calculated by using the count level set in step S4 to detect the level thereof (step S6). Next, based on the balance correction value stored in step S3 and the level of the tracking error signal $TE_1$ calculated in step S6, gain/balance correction values $e_{GB}$ and $f_{GB}$ are calculated (step S7). Then, using the gain/balance correction values $e_{GB}$ and $f_{GB}$ calculated in step S7, gain and balance are corrected (step S8), and automatic tracking adjustment ends.

Incidentally, in the foregoing processing, when gain correction is not to be performed, balance alone is corrected in the gain/balance correcting circuits 17 and 18 using the balance correction values $e_B$ and $f_B$ obtained in step S3, and automatic adjustment ends.

The following will explain the operations of the automatic adjustment circuit 4 in more detail, with reference to FIGS. 4 through 8.

First, processing for calculation of the offset correction values (step S1 in the flow-chart shown in FIG. 3) will be explained with reference to FIG. 4.

With the disk 1 inserted in the optical disk device, first, the control circuit 13 controls the laser control circuit 3 so that laser output of the pickup 2 is OFF (step S11). Depending on the way the pickup 2 is installed in the optical disk device, stray light, etc. may intermittently occur. Accordingly, at this time, laser light projection is turned OFF, and optical offset arising from stray light, etc. of the pickup 2, and offset in the signal processing circuit (not shown) of the pickup 2 for producing the deviation signals $e_1$ and $f_1$, are corrected.

In this way, the deviation signals $e_1$ and $f_1$ obtained at the time of setting the offset correction value are not produced on the basis of a signal detected from reflected light from the disk 1, and thus are not true track deviation signals used during reproducing, but are signals which include an offset component. However, for the sake of convenience here, signals of this kind will also be explained as deviation signals $e_1$ and $f_1$.

When the pickup 2 outputs the deviation signals $e_1$ and $f_1$, they are digitized by the AD converters 8 and 9 (step S12). Next, the deviation signals $e_2$ and $f_2$ from the AD converters 8 and 9, respectively, are sent to the low-pass filters 11b and 12b, respectively, where filter processing is performed (step S13).

Here, digitizing the deviation signals $e_1$ and $f_1$ allows the subsequent circuit to be used in common for different operations, and to be simplified. Specifically, it allows the filters 11a through 11c and 12a through 12c to be combined, simplifies data storage in the memory circuit 14, and allows the control section 21, the detecting section 22, the comparison section 23, the calculating section 24, the adding section 25, the counting section 26, etc., which are necessary for data processing, etc. within the control circuit 13, to be used in common for the different adjustment operations. Further, since the offset correcting circuits 15 and 16 and the gain/balance correcting circuits 17 and 18 perform processing using digital signals, these members can also be simplified.

As the deviation signals $e_2$ and $f_2$ pass through the low-pass filters 11b and 12b, respectively, only the respective DC components thereof are extracted. As discussed above, the low-pass filters 11b and 12b are provided either as separate filters or as part of the filter units 11 and 12, respectively, which are used in common. However, if combined in the filter units 11 and 12, in order to detect offset of the DC components included in the deviation signals $e_2$ and $f_2$, it is preferable to set the cutoff frequency for the low-pass filters 11b and 12b as low as possible, and to control switching of this cutoff frequency and the cutoff frequency for the low-pass filters 11c and 12c by means of the control circuit 13.

Next, the detecting section 22 detects the levels of the DC signals $e_4$ and $f_4$ from the low-pass filters 11b and 12b (step S14). Then the comparison section 23 compares the detected levels of the DC signals $e_4$ and $f_4$ with zero level (step S15). Then, based on the amount of deviation of the levels of the DC signals $e_4$ and $f_4$ from zero level, the calculating section 24 calculates offset correction values $e_O$ and $f_O$ necessary to correct the compared DC signals $e_4$ and $f_4$ to zero level (step S16). These offset correction values $e_O$ and $f_O$ are then stored in the memory circuit 14 (step S17).

Figure 3:
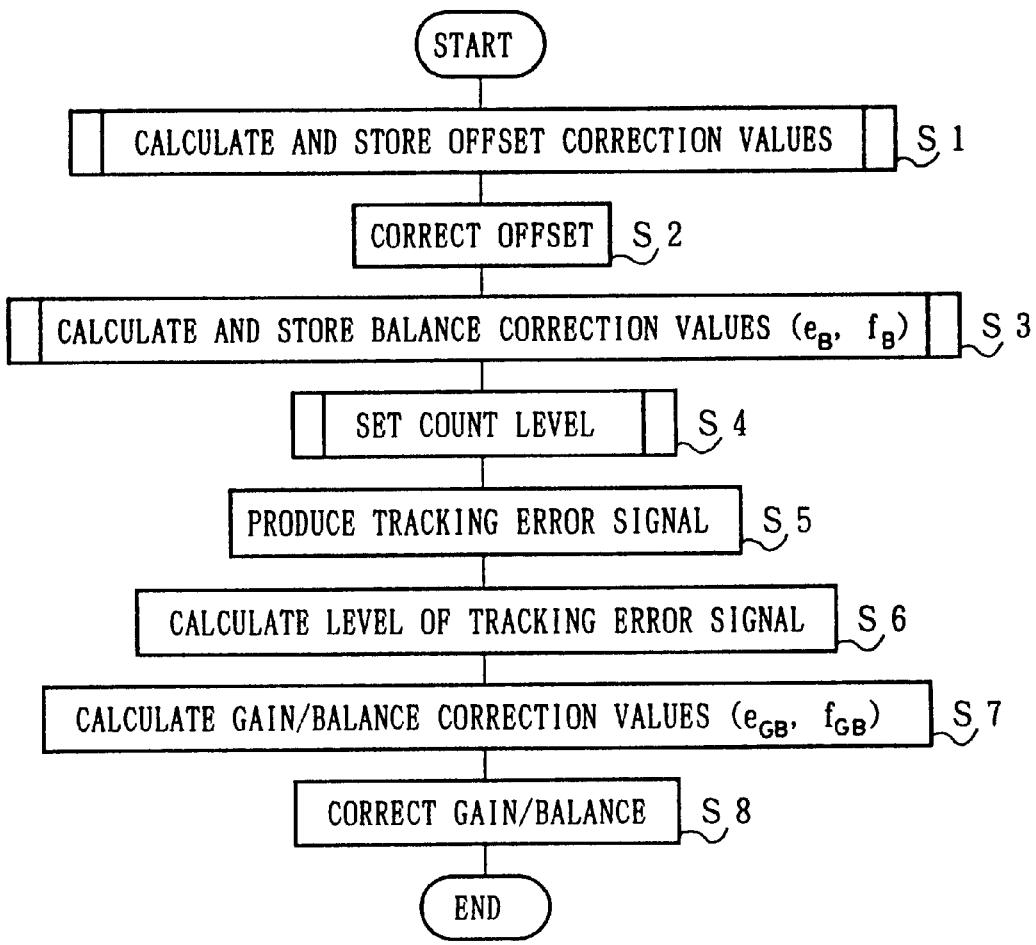
FIG. 3 is a flow-chart showing in outline processing steps for correction of offset, gain, and balance in the foregoing optical pickup position control device.
Figure 4:
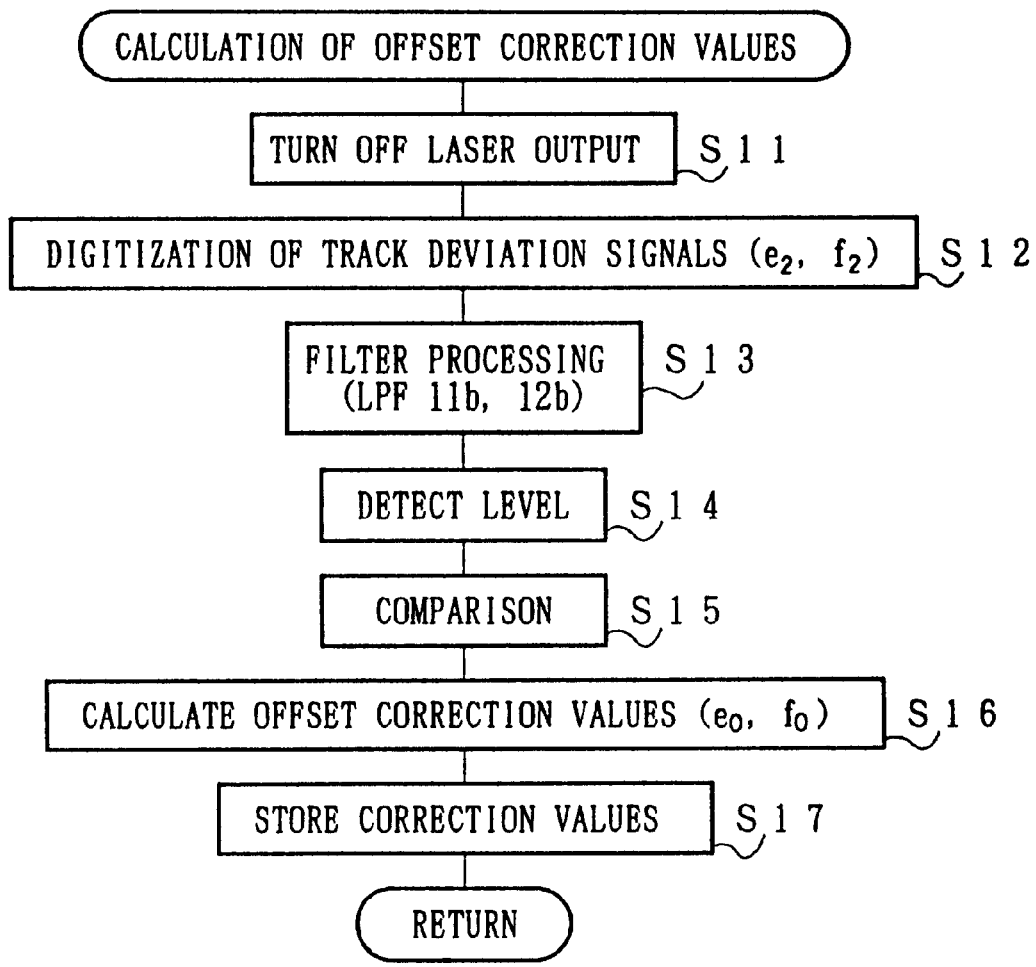
FIG. 4 is a flow-chart showing steps for calculation of an offset correction value.

Then, in the processing in step S2 of the flow-chart shown in FIG. 3, based on the foregoing offset correction values $e_O$ and $f_O$ sent from the control section 21, the offset correcting circuits 15 and 16 correct offset to zero level.

Once the foregoing offset correction values $e_O$ and $f_O$ have been calculated, there will be almost no deviation in offset, provided there is no influence from temperature change, changes over time, etc., and thus, by omitting the offset correction process during reproducing and recording, further shortening of the time needed for adjustment can be realized.

Figure 5:
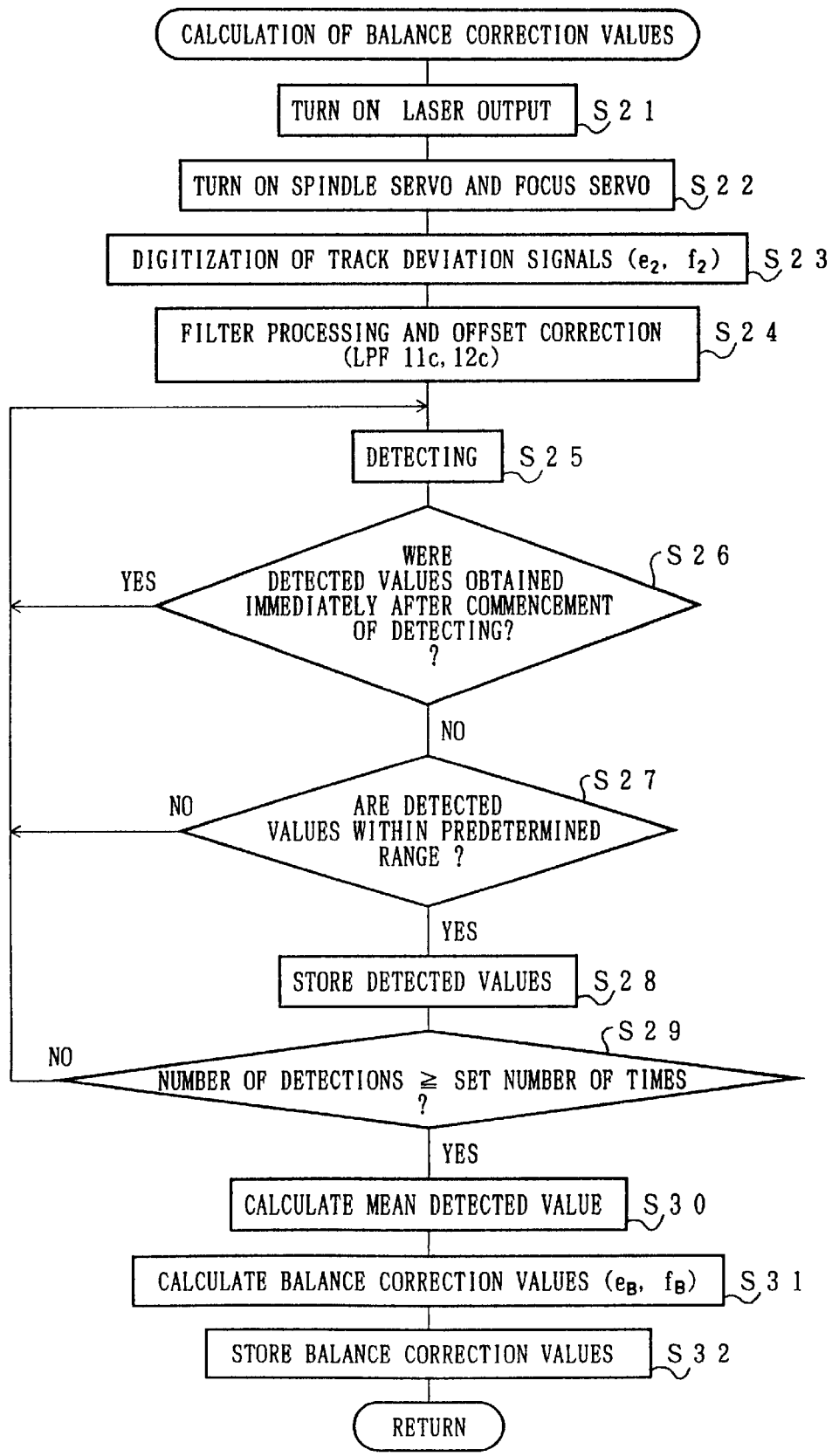
FIG. 5 is a flow-chart showing steps for calculation of a balance correction value.

The following will explain processing for calculation of balance correction values (step S3 in the flow-chart in FIG. 3), with reference to the flow-chart in FIG. 5.

First, after performing offset correction in step S2, as discussed above, by control by the laser control circuit 3, laser output of the pickup 2 is turned ON (step S21). Next, the focus servo circuit 7 shown in FIG. 1, and a spindle servo circuit (not shown) for a spindle motor which rotates the disk 1, are turned ON (step S22).

The tracking driving circuit 20 is, from the beginning of adjustment operations, in an OFF state.

Under the foregoing set conditions, the deviation signals $e_1$ and $f_1$ from the pickup 2 are digitized by the AD converters 8 and 9 (step S23). Next, the deviation signals $e_2$ and $f_2$ from the AD converters 8 and 9 are filter processed by passing through the low-pass filters 11c and 12c, respectively, yielding low-band signals $e_5$ and $f_5$ which undergo offset correction by the control section 21 using the foregoing offset correction values $e_O$ and $f_O$ (step S24). As a result, low-band signals $e_5'$ and $f_5'$, which have been offset corrected, are obtained ($e_5'=e_5+e_O$; $f_5'=f_5+f_O$)

In step S24, the deviation signals $e_2$ and $f_2$ pass through the low-pass filters 11c and 12c, which are also used (although at a different time) in setting the count level in the aforementioned step S4. However, it is necessary to use different cutoff frequencies for the low-pass filters 11c and 12c during balance correction value calculation and during the count level setting to be discussed below (see step S41).

The low-pass filters 11c and 12c extract from the deviation signals $e_2$ and $f_2$ only low-band components including DC components, i.e., the low-band signals $e_5$ and $f_5$. The low-pass filters 11c and 12c may be combined with the low-pass filters 11b and 12b, but in order to expand the low-band frequency range so as to make it easier to adjust balance when signal change is large, the cutoff frequency for the low-pass filters 11c and 12c is set higher than that for the low-pass filters 11b and 12b, as discussed above. Thus, the low-pass filters 11b and 12b function for offset correction, and the low-pass filters 11c and 12c function for balance correction.

However, when the filter units 11 and 12 are structured as digital filters, it is possible to use the low-pass filters 11b and 12b as the low-pass filters 11c and 12c, respectively, by changing the cutoff frequency of the low-pass filters 11b and 12b. In other words, since the cutoff frequency of a digital filter can be changed by changing the filter coefficient, it can be used in common for various different correction operations.

Next, the detecting section 22 detects the levels of the offset-corrected low-band signals $e_5'$ and $f_5'$ (step S25). Then, in order to determine whether the detected values obtained in step S25 are values obtained immediately after commencement of detecting, detection is repeated a predetermined number of times (several times) (step S26). Thus, when reading of the data of the disk 1 by the pickup 2 begins, reading of low-band signals $e_5'$ and $f_5'$ which include unstable components due to scratches or dust on the disk 1 can be avoided.

Then, after processing in step S26 is complete, it is determined that stable low-band signals $e_5'$ and $f_5'$ have been inputted, and processing proceeds to the next step, where the comparison section 23 determines whether the detected values are within a predetermined range (step S27). If the detected values are outside this predetermined range, processing returns to step S25, but if the detected values are within the predetermined range, they are stored in the memory circuit 14 (step S28). By means of this processing, it is possible to store only detected values which are within a needed predetermined range.

Next, in order to obtain a needed number of detected values, it is determined, by means of a count of the counting section 26, whether the number of detections performed is greater than or equal to a previously set number of times (n times) (step S29), and if the number of detections is smaller than the predetermined number of times, processing returns to step S25, but if the number of detections is greater than or equal to the predetermined number of times, operations proceed to the next step. Next, based on the detected values stored in the memory circuit 14, the calculating section 24 calculates a mean value of the detected values (step S30). Next, based on the mean detected value, the calculating section 24 calculates balance correction values $e_B$ and $f_B$ (step S31), and these balance correction values $e_B$ and $f_B$ are stored in the memory circuit 14 (step S32).

Incidentally, in the present embodiment, the number of times for detection (n) is set to, for example, 64 times for every 4 msec, but the number of times may be determined in accordance with the performance desired of the automatic adjustment circuit 4. For example, if the number of times is increased, precision of the mean value calculated in step S30 can be improved, but the time necessary for processing will be increased. Accordingly, the number of times should preferably be as small as possible, provided this creates no problems with regard to precision.

In step S31, the balance correction values $e_B$ and $f_B$ are calculated according to the following equations. Here, $e_m$ and $f_m$ are mean values of the respective detected values (the low-band signals $e_5'$ and $f_5'$).

$$e_B = (e_m + f_m)/2e_m$$

$$f_B = (e_m + f_m)/2f_m$$

Figure 6:
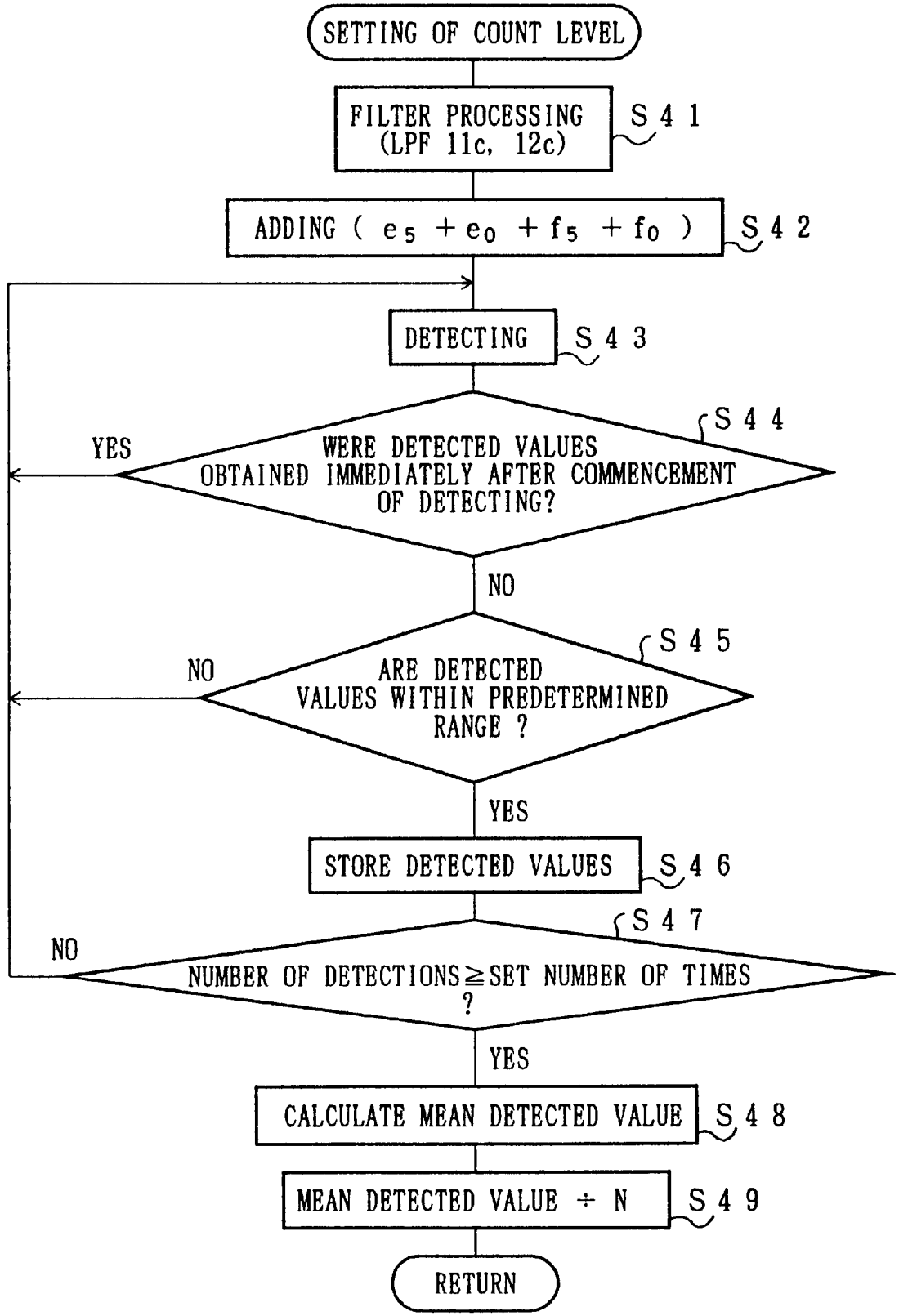
FIG. 6 is a flow-chart showing steps for setting of a count level necessary for setting a period for detecting a tracking error level.

The following will explain processing for setting of the count level (step S4 in the flow-chart shown in FIG. 3), with reference to FIG. 6.

First, filter processing of the digital deviation signals $e_2$ and $f_2$ obtained in the aforementioned step S23 is performed by passing the$_m$ through the low-pass filters $11c$ and $12c$ (step S41). Thus, the DC components are extracted from the deviation signals $e_2$ and $f_2$.

The adding section 25 of the control circuit 13 then adds the low-band signals $e_5$ and $f_5$ from the low-pass filters $11c$ and $12c$ to the offset correction values $e_0$ and $f_0$ (step S42), thus obtaining an added signal $e_{add}$ ($e_{add}=e_5+e_0+f_5+f_0$), which is detected by the detecting section 22 (step S43).

The DC levels of the low-band signals $e_5$ and $f_5$ normally differ, and if a count level is set using only one of these unequal low-band signals $e_5$ and $f_5$, an accurate setting level cannot be obtained. For example, if the count level is set based on the larger of the low-band signals $e_5$ and $f_5$, the count level may be larger than the signal level, and there may be cases in which the count level and the tracking error signal $TE_1$ do not cross. If, on the other hand, the count level is set based on the smaller of the signal levels, the count level may be too small, and small signals such as noise signals may cause malfunctions. Accordingly, the foregoing problems are avoided here by means of the addition processing in step S42.

Next, the processing in steps S44 through S47 is equivalent to that in steps S26 through S29 of the foregoing processing for calculating the balance correction value, and accordingly, explanation thereof will be omitted.

Next, the calculating section 24 calculates a mean value of the levels of the added signals $e_{add}$ from the detected values stored in the memory circuit 14 in step S46 (step S48). Then, by dividing the calculated mean value M by an adjustment value N, a shift quantity L is calculated (step S49), which is a quantity of shift from a level $V_0$ necessary to set the count level.

Since the DC components and AC components of the deviation signals $e_1$ and $f_1$ are both amplified by the same amplifier, if the DC component increases, the AC component increases correspondingly. Accordingly, as discussed above, the shift quantity L is set on the basis of the signal levels of the low-band signals $e_5$ and $f_5$. Here, in order to set the shift quantity L to a suitable value in accordance with the structure of the system, the shift quantity L is found by dividing the foregoing mean value M by an adjustment value N calculated through experimentation.

Further, when there is a large difference between the signal levels of the low-band signals $e_5$ and $f_5$, which include DC components, it is preferable to change the setting of the count level. This enables accurate detection of a tracking error signal $TE_1$ obtained when the pickup 2 is moved a predetermined time or predetermined number of tracks in a radial direction of the disk 1.

Incidentally, a tracking error signal $TE_1$ is obtained not only when the pickup 2 is moved, but also when the pickup 2 is stopped and the disk 1 is rotated in a decentered state.

Figure 7:
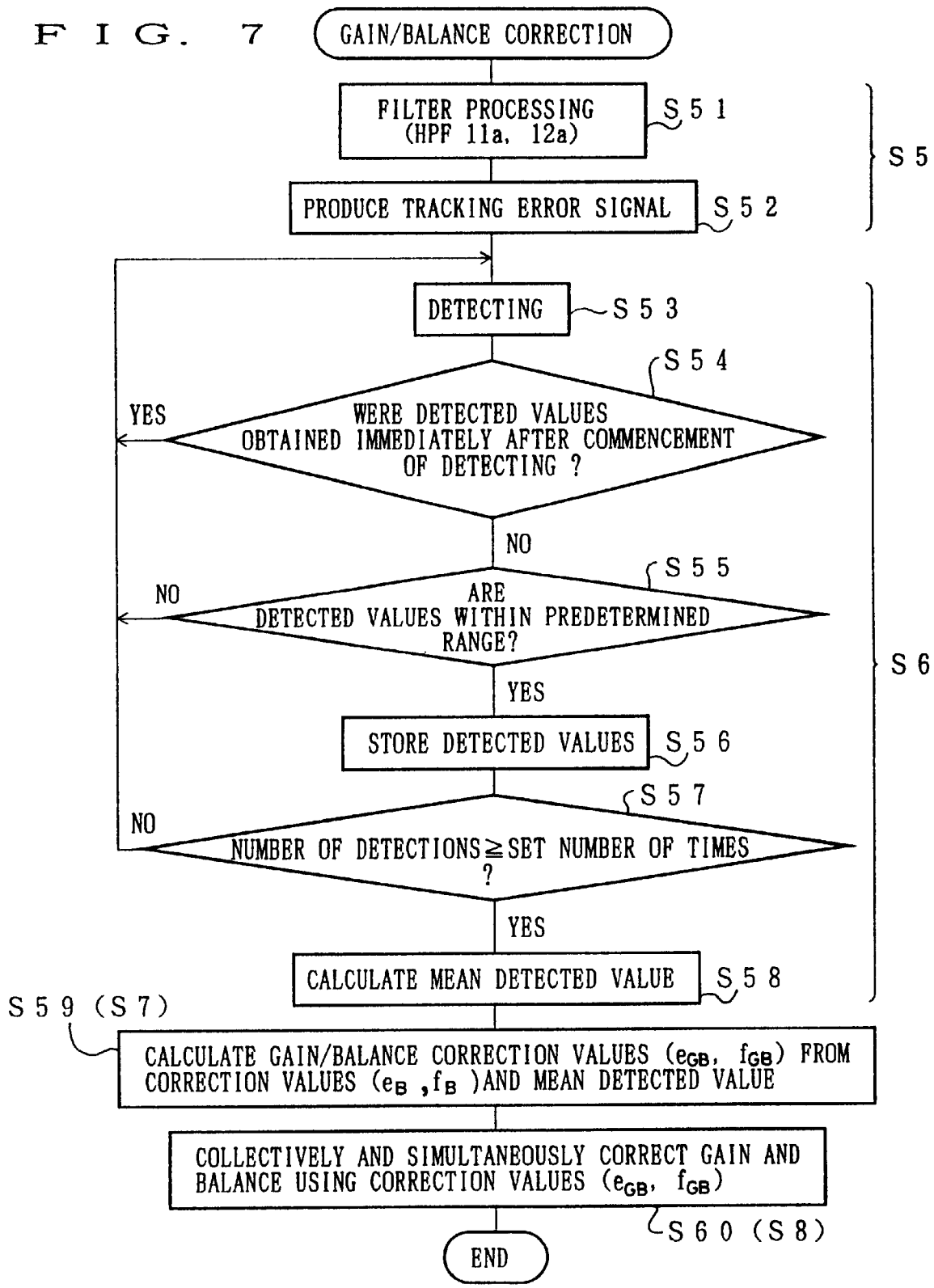
FIG. 7 is a flow-chart showing steps for gain/balance correction processing.

To continue, the following will explain processing from producing of the tracking error signal through gain/balance correction (steps S5 through S8 in the flow-chart in FIG. 3) with reference to the flow-chart in FIG. 7.

First, the digital deviation signals $e_2$ and $f_2$ are filter processed by passing through the high-pass filters $11a$ and $12a$ (step S51). Thus, low-band components of the deviation signals $e_2$ and $f_2$ are eliminated. Next, on the basis of AC signals $e_3$ and $f_3$ from the high-pass filters $11a$ and $12a$, the tracking error producing circuit 10 produces a tracking error signal $TE_1$ (step S52), which is detected by the detecting section 22 (step S53).

Figure 8:
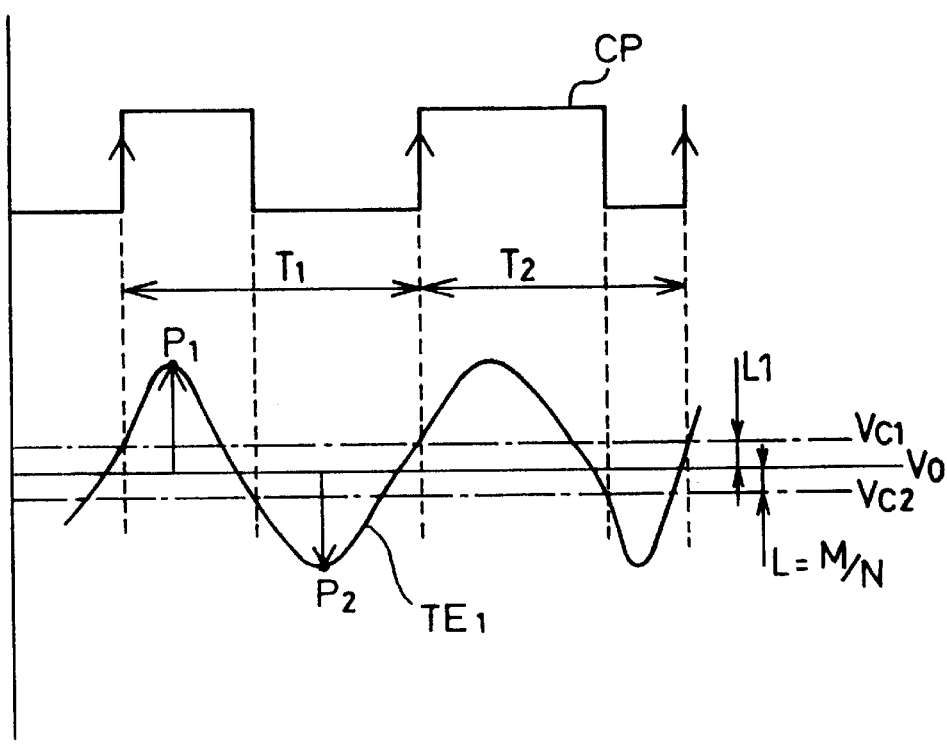
FIG. 8 is a wave-form diagram showing a method for detecting a tracking error signal level in the foregoing optical pickup position detecting device.
Figure 9:
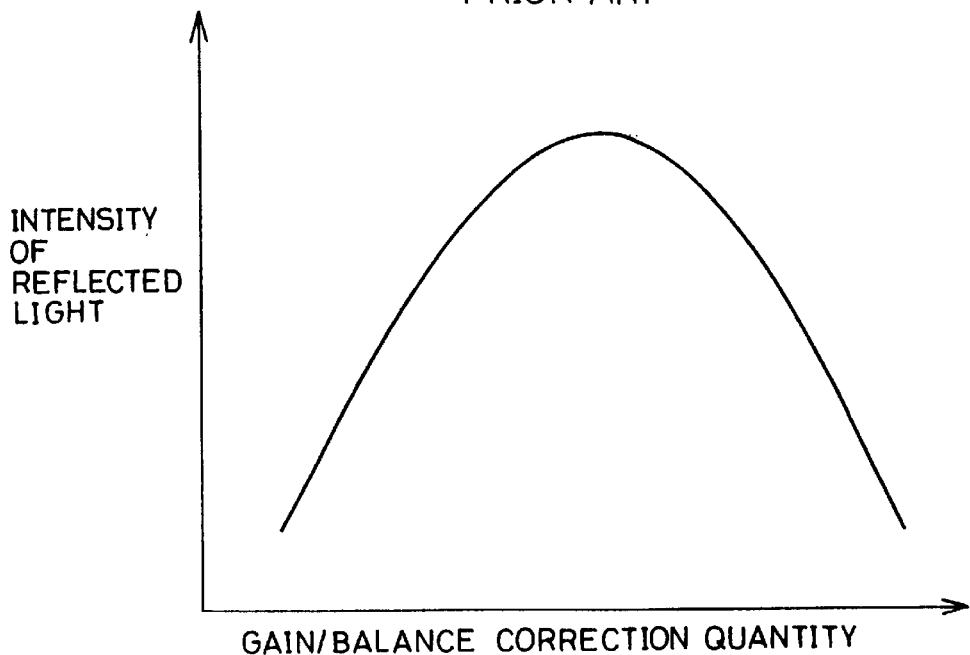
FIG. 9 is a graph showing the relationship between gain/balance correction quantity and reflected light signal intensity in the conventional art in Document 3.

Here, detection timing and the method of detection will be explained with reference to FIG. 8.

Normally, due to decentering of the disk 1, etc., the timing with which the beam spot crosses a track is not uniformly specified, and accordingly, the period of the tracking error signal $TE_1$ is also not uniform. In level detecting by the detecting section 22, unless the period of the tracking error signal $TE_1$ is specified, level detection for each period cannot be accurately performed. For this reason, in order to accurately detect the levels of the deviation signals $e_1$ and $f_1$ or the tracking error signal $TE_1$, the control circuit 13 (pulse generator circuit 27) produces a comparative pulse CP on the basis of the foregoing crossing timing, and detecting is performed with a period based on the comparative pulse CP, as shown in FIG. 8. The comparative pulse CP is produced by a pulse generator circuit 27 based on the result of a comparison of count levels $V_{C1}$ and $V_{C2}$ with the tracking error signal $TE_1$.

The comparative pulse CP is produced as a rectangular pulse which rises when the tracking error signal $TE_1$, as it increases, crosses the larger count level $V_{C1}$, and falls when the tracking error $TE_1$, as it decreases, crosses the smaller count level $VC_2$. Peak levels $P_1$ and $P_2$ of the tracking error signal $TE_1$ during each period $T_1, T_2, \ldots$ from one rise of the comparative pulse CP to the following rise are detected, and a peak-to-peak value of the tracking error signal $TE_1$ is detected as $P_1+P_2$.

Further, in producing the comparative pulse CP, the standard level for comparison is given hysteresis by providing two count levels $V_{C1}$ and $VC_2$. Thus, even if noise (a small signal) due to scratches or dust on the disk 1 is superimposed on the tracking error signal $TE_1$ as the beam spot crosses the track, rise and fall of the tracking error signal $TE_1$ will not be misdetected, and the comparative pulse CP can be accurately produced.

Next, the processing in steps S54 through S57 is equivalent to that in steps S26 through S29 of the foregoing processing for calculating the balance correction value, and accordingly, explanation thereof will be omitted. Next, the calculating section 24 calculates a mean detected value on the basis of the detected values stored in the memory circuit 14 (step S58).

The foregoing processing in steps S53 through S58 corresponds to the processing for calculating the level of the tracking error signal in step S6.

Next, the calculating section 24 calculates gain/balance correction values $e_{GB}$ and $f_{GB}$ (step S59), using the balance correction values $e_B$ and $f_B$ stored in the memory circuit 14 in step S31, the tracking error signal level (peak-to-peak value) calculated as above, and a tracking gain standard value.

Here, the tracking gain standard value is set as follows.

A standard value R is set to a value calculated according to the equation below, using (i) signal levels (maximum and minimum values) of the deviation signals $e_1$ and $f_1$; (ii) a maximum value $B_{max}$ which may be shown by the balance correction values $e_B$ and $f_B$ in the gain/balance correcting circuits 17 and 18, determined in advance based on the voltage applied to the system, etc.; (iii) a predicted minimum value $TE_0$ of the tracking error signal $TE_1$, determined in accordance with the reading ability of the pickup 2; and (iv) a maximum setting value $G_{max}$ of tracking gain correction.

$$R=(G_{max}*TE_0)/B_{max}$$

Then, in step S59, the gain/balance correction values $e_{GB}$ and $f_{GB}$ are calculated according to the equations below, on the basis of the foregoing standard value R, the mean value $M_{p\text{-}p}$ calculated in step S58, and the balance correction values $e_B$ and $f_B$.

$$e_{GB}=(R/M_{p\text{-}p})*e_B$$

$$f_{GB}=(R/M_{p\text{-}p})*f_B$$

Then, by inputting the gain/balance correction values $e_{GB}$ and $f_{GB}$ calculated in step S59, through the control section 21, to the gain/balance correction circuits 17 and 18, gain and balance are simultaneously and collectively adjusted. In other words, adjusting gain and balance of both of the deviation signals also adjusts gain and balance of the tracking error signal $TE_2$ in the tracking servo circuit 6. Further, each of the correction values is stored in the memory circuit 14, and the next time the same disk 1 is reproduced, time can be saved in adjustment by using the stored values. In addition, by using a tracking gain standard value which is unique to each optical disk device, gain correction can be set easily and quickly by means of computing alone.

In the present embodiment, as discussed above, offset, gain, and balance of tracking and focus can be adjusted collectively and simultaneously. Accordingly, there is no need to apply an external signal, as in conventional adjustment methods, and the system is not placed in a state different from the actual operating state.

In the present embodiment, it is important to set in advance, in the form of standard values, the values which should be shown by the deviation signals $e_1$ and $f_1$ and the difference signal between the deviation signals $e_1$ and $f_1$. By determining standard values in this way, based on the standard values and the detected values, correction values can be calculated and correction performed collectively by the control circuit 13. In other words, collective processing can be realized by merely providing the gain/balance correcting circuits 17 and 18 with the correction values obtained by calculation using the standard values, and the time necessary for automatic adjustment can be greatly reduced.

In contrast, with a method such as that of the foregoing Document 3, in which one deviation signal is corrected using the other deviation signal as a standard, if the deviation signal used as a standard is not an accurate value, the other deviation signal cannot be corrected accurately. Thus, in order to avoid this kind of problem, it becomes necessary to perform operations to adjust to an accurate value the deviation signal to be used as a standard. Further, even if the deviation signal to be used as a standard is an accurate value, it is necessary to confirm whether the other deviation signal has been influenced by the foregoing adjustment. In this way, the foregoing correction method requires a large amount of time, but in the present embodiment, correction can be performed in a short time by means of the collective processing discussed above.

Further, adjusting by applying an external signal necessitates control for turning the servo ON during adjustment, an oscillator for producing the external signal, a band-pass filter for extracting the external signal, etc. In contrast, with the device according to the present embodiment, which does not require an external signal, an external signal need not be processed at the same time gain/balance adjustment is being performed, and thus each detected value can be detected accurately. For this reason, clip, etc. of a compound signal due to the superimposition of the external signal need not be taken into account. Accordingly, the structure of the control system and the control method can be simplified, and, when constructing the present device as an integrated circuit, the area of installation, number of members, number of inspections, etc. can be reduced.

The conventional Documents 1 and 2 adjust gain and balance individually, and adopt, for example, the aforementioned method of applying an external signal during automatic gain adjustment. Moreover, in Document 1, a servo gain correction value is detected using special filters, etc. for servo loop control, and gain is corrected on the basis of this correction value. Thus the time necessary for adjustment is the total of the time necessary for the individual adjustments. Further, since in conventional balance adjustment, an optimum correction value is determined based on, not the results of calculation, but the results of repeatedly changing the correction value, a comparatively long time is needed to determine the optimum correction value.

However, in the present embodiment, by setting the correction values on the basis of calculation from detected values, gain and balance are collectively and simultaneously adjusted, thus enabling the time needed for adjustment to be greatly shortened. In order to ensure reliability, detection is performed multiple times, but detection time is held to within, for example, 256 msec, and is thus short enough that it can effectively be ignored.

With the conventional art, in contrast, although detection requires, for the sake of reliability, at least as much time as in the present embodiment, adjustment is also repeated at least several times. In view of this fact, it is clear that the time required for adjustment in the present embodiment has been greatly shortened.

Further, by digitizing signals such as the deviation signals and pickup position signals (the tracking error signal and focus error signal) and changing set coefficients in the control section 21, so as to perform processing using a DSP, the processing circuit of the control system, the various filters, etc. can be used in common. Furthermore, since offset, gain, and balance correction control, as well as laser output control, tracking control, and focus control are all concentrated in and performed by the control circuit 13, circuit structure can be simplified.

By combining multiple functions in a few members in this way, the number of members can be reduced. This contributes to reduction of size and weight, and of the number of assembly operations, and thus cost can be reduced.

Next, each correction will be explained in detail.

With regard to offset correction, after receiving the digital deviation signals $e_2$ and $f_2$ (which, as mentioned above, are not actual deviation signals) from the low-pass filters 11*b* and 12*b*, the control circuit 13 sets the correction values by simply performing computation processing. In other words, no mechanical operations are necessary, and adjustment requires almost no time.

With regard to balance correction, reflected light is read, and after receiving the digital deviation signals $e_2$ and $f_2$ from the low-pass filters 11*b* and 12*b*, the control circuit 13 sets the correction values by simply performing computation processing, and storing the results thereof in the memory circuit 14. In other words, except for the time from reception of the reflected light until the deviation signals $e_2$ and $f_2$ become stable, no mechanical operations are necessary, and adjustment requires almost no time.

With regard to gain correction, peak-to-peak values of the digital tracking error signal $TE_1$ are detected, and gain correction values ($e_G$, $f_G$) are determined based on these values, and then, by comprehensive computation of the gain correction values ($e_G$, $f_G$) and the foregoing balance correction values ($e_B$, $f_B$), gain and balance are collectively corrected. This series of processing is computation using inputted values, and is entirely performed by the control circuit 13, except for switching of the cutoff frequency of the low-pass filters and processing performed by the gain/balance correcting circuits 17 and 18. In the present embodiment, mechanical operations are only required in driving the pickup 2 in order to obtain the tracking error signal $TE_1$ by moving the light beam, but since, as discussed above, it is not always necessary to move the pickup 2, almost no mechanical operations are necessary.

It can be easily seen from the above that in the present embodiment, there are no steps requiring a large amount of time, and the steps have been greatly reduced in comparison with conventional adjustment methods.

In addition, in the present embodiment, the time required for adjustment can be further reduced in the following ways.

First, offset correction is performed only at the production factory, and is not performed after shipping to the market. Accordingly, offset correction is excluded from the automatic adjustment which is performed each time the user changes the disk 1.

Setting of the count level is also performed only at the production factory. Accordingly, count level setting is also excluded from the automatic adjustment which is performed each time the user changes the disk 1.

With regard to adjustment of gain and balance, in the present embodiment, the steps for setting the gain correction value and the balance correction value are performed separately from the point of view of time sequence, but these steps are performed simultaneously. Specifically, if the deviation signals $e_2$ and $f_2$ are alternately inputted into the high-pass filters 11a and 12a and the low-pass filters 11c and 12c, both of the foregoing steps can be performed simultaneously, which contributes to simplification of the entire process.

By performing the foregoing processing, the time $t_1$ required to perform automatic tracking adjustment each time the user changes the disk 1 is calculated as shown below, where $t_{GB}$ is the time required for the steps for setting the gain/balance correction values, and $t_D$ is the time required for the processing in the aforementioned step S26.

$t_1 = t_{GB} + t_D$

= (4 msec×64)+(approx. 40 msec)

≈300 msec

In this way, the time $t_1$ required for automatic adjustment can be greatly shortened.

With the conventional method (where, after balance correction, gain is repeatedly corrected), however, the time $t_2$ required to perform automatic adjustment is calculated as shown below, where $t_G$ is the time required for gain correction, $t_B$ is the time required for balance correction, and s is the number of cycles of repetition of gain correction.

$t_2 = t_G + t_B \times s$

= (approx. 250 msec)+(approx. 250 msec)×(4 cycles)

≈2 sec

In the foregoing equation, $t_G$ and $t_B$ are each approximately 250 msec; these values are actual values used in a device previously marketed by the present applicant. Similarly, s is based on the actual mean number of cycles in such a device. However, these values merely represent the results of numerical calculation, and are further shortened in actual use. Further, when the maximum number of cycles allowable in reading is 8, then $t_2 \approx 4$ sec.

As the results of the foregoing calculations show, provided there are no problems in adjustment, the time for automatic adjustment $t_1$ is reduced to approximately ⅙ of $t_2$. Further, in conventional devices, when some kind of problem in adjustment requires more time, $t_2$ requires, as shown above, a maximum of approximately 4 sec, but in the device according to the present embodiment, because computation is used, adjustment can be completed in one time (300 msec) regardless of the circumstances. Accordingly, in such a case, the time for automatic adjustment $t_1$ is reduced to approximately ¹⁄₁₃ of $t_2$.

The time required for adjustment is shortened in the case of focus adjustment as well as tracking adjustment. In other words, in the present embodiment, it can be seen that the total time required for automatic adjustment is greatly reduced by combining automatic adjustment of tracking and focus.

Further, the main reasons superior performance can be attained in each of the foregoing corrections are the fact that the present position control device is almost entirely composed of circuits for digital processing, and the fact that the deviation signals are handled directly. Even when processing with digital signals, if the method of processing is the same as in processing with analog signals, corrections cannot be processed collectively (as in the present embodiment), and a large amount of time is required for automatic adjustment.

(i) The first optical pickup position control device according to the present invention, for an optical pickup which optically performs at least one of recording a signal in a track on a disk and reproducing a signal from a track on the disk, includes a servo circuit which performs (a) position control which causes light projected by the optical pickup to follow a target track such that the light substantially follows the centerline of the track, and (b) position control which adjusts a focus position of light projected by the optical pickup such that the light is substantially focused on the disk; a digitizer, which digitizes two deviation signals, outputted from the optical pickup, which express a quantity of deviation of the optical pickup from a target position which is the object of at least one of the position control (a) and the position control (b); a difference signal producing section, which, based on the digitized deviation signals, produces a difference signal between the two deviation signals; a correction value calculating section, which, based on the digitized deviation signals, calculates a balance correction value to be applied to the two deviation signals in order to correct balance therebetween, or, based on the digitized deviation signals, the difference signal obtained from the two deviation signals, and a previously set standard value unique to the position control device, calculates a gain correction value to be applied to the two deviation signals in order to correct gain of the deviation signals in the servo circuit; and a correcting section, which corrects balance based on the balance correction value, or corrects gain based on the gain correction value.

In this position control device, the correction value calculating section calculates a balance correction value or a gain correction value, and the correcting section corrects balance or gain. Accordingly, operations for adjustment of correction are unnecessary, and correction can be made in a short time. Specifically, since a standard value unique to the position control device is used in calculating the gain correction value for gain correction, calculating an appropriate gain correction value does not require processing such as setting, measurement, storing, comparison, etc. Further, since the balance correction value or gain correction value is applied to both deviation signals, appropriate adjustment of one of the deviation signals is not necessary, as it is when one deviation signal is corrected using the other deviation signal as a standard. Moreover, processing is performed using digital signals, and thus calculation of each correction value can be performed at high speed and using a simple structure. Accordingly, balance or gain can be corrected in a short time and with high precision, and the structure for performing this correction can be simplified.

(ii) Another optical pickup position control device according to the present invention, for an optical pickup which optically performs at least one of recording a signal in a track on a disk and reproducing a signal from a track on the disk, includes: a tracking servo circuit for performing tracking adjustment, based on two deviation signals corresponding to quantities of deviation from a centerline of a track toward either side thereof and a difference signal between the two deviation signals, such that light projected by the optical pickup follows the track; a digitizer, which digitizes the two deviation signals; a correction value calculating section, which, based on the digitized deviation signals, calculates an offset correction value for correcting offset of the deviation signals and a balance correction value for correcting balance between the deviation signals, and, based on the digitized deviation signals, the difference signal obtained from the two deviation signals, and a previously set standard value unique to the position control device, calculates a gain correction value for correcting gain of the deviation signals in the tracking servo circuit; and a correcting section which, based on the correction values, simultaneously corrects offset, balance, and gain.

In this position control device, the correction value calculating section calculates each correction value for tracking control, and the correcting section simultaneously corrects offset, balance, and gain. Accordingly, correction can be performed in a shorter time than in the position control device in (i) above. Moreover, since a standard value unique to the position control device is used in calculating the gain correction value for gain correction, calculating an appropriate gain correction value does not require processing such as setting, measurement, storing, comparison, etc. Further, processing is performed using digital signals, and thus calculation of each correction value can be performed at high speed and using a simple structure. Accordingly, offset, balance, and gain can be corrected in a short time and with high precision, and the structure for performing these corrections can be simplified.

(iii) A further optical pickup position control device according to the present invention, for an optical pickup which optically performs at least one of recording a signal in a track on a disk and reproducing a signal from a track on the disk, includes a tracking servo circuit for performing tracking adjustment, based on two deviation signals corresponding to a quantity of deviation from a centerline of a track toward either side thereof and a difference signal between the two deviation signals, such that light projected by the optical pickup follows the track; a digitizer, which digitizes the two deviation signals; a correction value calculating section, which, based on a comparison between the digitized deviation signals, calculates an offset correction value for correcting offset of the deviation signals and a balance correction value for correcting balance between the deviation signals; and a correcting section which, based on the correction values, simultaneously corrects offset and balance.

In this position control device, in tracking control, the correction value calculating section calculates both correction values, and the correcting section simultaneously corrects offset and balance. Accordingly, operations for adjustment of correction are unnecessary, and correction can be made in a short time. Further, processing is performed using digital signals, and thus calculation of each correction value can be performed at high speed and using a simple structure. Accordingly, offset and balance can be corrected in a short time and with high precision, and the structure for performing these corrections can be simplified.

(iv) In the position control device in either (ii) or (iii) above, it is preferable to further provide a light projection shutoff section, which turns off projection of light from the optical pickup, and for the correction value calculating section to calculate the offset correction value when projection of light is turned off. By this means, offset also including the influence of the optical system is adjusted. Further, since light projection can be turned off by shutoff control of the laser output of the optical pickup, it is not necessary to block the light path to keep the photoreceptor sections of the optical pickup from receiving reflected light from the disk. Accordingly, the structure of the position detecting device can be simplified and its manufacture facilitated.

(v) In the position control device in either (ii) or (iii) above, it is preferable to further provide a low-pass filter, which extracts from each of the deviation signals a signal component which includes a direct-current component, and for the correction value calculating section to calculate the offset correction value and balance correction value using the signal components from the low-pass filter. By using a low-pass filter to extract signal components which include direct-current components, there is little influence from high-band noise, etc., and highly reliable offset correction and gain correction values can be calculated based on signals of stable level. Accordingly, offset and balance can be corrected with high precision.

(vi) In this position control device, it is preferable to further provide a cutoff frequency changing section, which changes a cutoff frequency of the low-pass filter according to whether the offset correction value or the balance correction value is to be calculated. By changing the cutoff frequency, the frequency band of a signal component obtained from the low-pass filter can be freely set, and the low-pass filter can be used in common for different operations. Accordingly, correction values can be calculated more accurately, and circuit structure can be simplified.

(vii) In any of the position control devices in (i) through (iii) above, it is preferable to further provide a low-pass filter, which extracts from each of the deviation signals a signal component which includes a direct-current component, and for the correction value calculating section to include a detecting section, which detects a level of each of the signal components from the low-pass filter a predetermined number of times, and for the correction value calculating section to calculate the balance correction value based on a mean value of all of the detected values. By using a low-pass filter to extract signal components which include direct-current components, there is little influence from high-band noise, etc., and the balance correction value can be calculated based on signals of stable level. Further, the balance correction value is calculated based on a mean value of all of the detected value, and thus the reliability of the balance correction value can be improved. Accordingly, balance can be corrected with high precision.

(viii) In the position control device in either (i) or (ii) above, it is preferable to provide the difference signal producing section between the correcting section and the optical pickup. By this means, in comparison to, for example, a structure in which the difference signal is produced in the part of the circuit following the correcting section, there is no influence from the correcting section, and the correction values can be easily calculated. Accordingly, gain and balance can be easily corrected.

(ix) In the position control device in either (i) or (ii) above, it is preferable to further provide a high-pass filter, which extracts from each of the deviation signals a signal component which includes a high-frequency component, and for the difference signal producing section to produce the difference signal by detecting a difference between the signal components from the high-pass filter. By this means, gain can be corrected with no influence from direct-current components due to uneven balance. Accordingly, gain can be corrected with high precision.

(x) In this position control device, it is preferable if the correction value calculating section includes a detecting section, which detects a level of the difference signal a predetermined number of times, and if the correction value calculating section calculates the gain correction value based on a mean value of all of the detected values. By this means, a more accurate mean value of the difference signal can be obtained. Accordingly, gain can be corrected with higher precision.

(xi) In the position control device in either (vii) or (x) above, it is preferable if the correction value calculating section obtains the mean value using only detected values within a predetermined range. By this means, detected values which contain noise resulting from an irregularity of the disk (scratches, dust) are not read. Accordingly, reliability of gain correction can be improved.

(xii) In the position control device in either (vii) or (x) above, it is preferable if the correction value calculating section does not use a predetermined number of detected values immediately after commencement of detecting. By this means, values detected immediately after commencement of detecting, which are not stable, are not used, and subsequent stable detected values are used. Accordingly, impairment of the precision of gain correction can be prevented.

(xiii) In the position control device in either (i) or (ii) above, it is preferable if the correction value calculating section sets a threshold value, used for determining a timing with which light from the optical pickup crosses a track, in accordance with direct-current levels of the deviation signals, and if the correction value calculating section includes a detecting section, which detects a level of the difference signal, which is necessary in calculating the gain correction value with the timing determined on the basis of the threshold value. By this means, even if the direct-current levels of the deviation signals fluctuate, the threshold value (which is the standard for determining timing) also fluctuates in accordance with the fluctuations in the direct-current levels of the deviation signals, and thus unevenness in determination of timing can be eliminated. Accordingly, gain can be corrected with high precision.

(xiv) In this position control device, it is preferable if the detecting section determines an interval of each period of the difference signal by comparing the difference signal with the threshold value, and detects, a predetermined number of times, a level of the difference signal during each detecting period determined by the intervals; and if the correction value calculating section calculates the gain correction value based on a mean value of all of the detected values. By this means, an interval of the period of the difference signal, which is actually not uniform, can be accurately determined. Accordingly, the level of the difference signal can be accurately detected.

(xv) In this position control device, it is preferable if the detecting section sets as the threshold value two values, a positive value and a negative value, centered on zero level. By this means, errors in determination do not occur, even if the difference signal includes some noise. Accordingly, the level of the difference signal can be detected with high precision and with little influence from noise, etc.

(xvi) A further optical pickup position control device according to the present invention, for an optical pickup which optically performs at least one of recording a signal in a track on a disk and reproducing a signal from a track on the disk, includes: a tracking servo circuit for performing tracking adjustment, based on two deviation signals corresponding to quantities of deviation from a centerline of a track towards either side thereof and a difference signal between the two deviation signals, such that light projected by the optical pickup follows the track; a digitizer, which digitizes the two deviation signals; a difference signal producing section, which, based on the digitized deviation signals, produces a difference signal between the two deviation signals; and a threshold value setting section, which sets a threshold value, used for determining a timing with which light from the optical pickup crosses a track, in accordance with direct-current levels of the digitized deviation signals.

In this position control device, even if the direct-current levels of the deviation signals fluctuate, the threshold value (which is the standard for determining timing) also fluctuates in accordance with the fluctuations in the direct-current levels of the deviation signals, and thus unevenness in determination of timing can be eliminated. Further, processing is performed using digital signals, and thus calculation of each correction value can be performed at high speed and using a simple structure. Accordingly, a period for setting the level of the difference signal can be set correctly, and the structure for performing this setting can be simplified.

The embodiments and concrete examples of implementation discussed in the foregoing detailed explanation of the present invention serve solely to illustrate the technical contents of the present invention, which should not be narrowly interpreted within the limits of such concrete examples, but rather may be applied in many variations without departing from the spirit of the present invention and the scope of the patent claims set forth below.

What is claimed is:

1. A position control device for an optical pickup which optically performs at least one of recording a signal in a track on a disk and reproducing a signal from a track on said disk, said position control device comprising:

a servo circuit which performs (a) position control which causes light projected by said optical pickup to follow a target track such that the light from said optical pickup substantially follows a centerline of the track, and (b) position control which adjusts a focus position of light projected by said optical pickup such that the light from said optical pickup is substantially focused on said disk;

digitizing means, which digitize two deviation signals, outputted from said optical pickup, which express a quantity of deviation of said optical pickup from a target position which is the object of at least one of said position control (a) and said position control (b);

difference signal producing means, which, based on the digitized deviation signals, produce a difference signal between the two deviation signals;

correction value calculating means, which, based on the digitized deviation signals, calculate balance correction values to be applied to the two deviation signals in order to correct balance therebetween; or, based on the digitized deviation signals, the difference signal obtained from the two deviation signals, and a previously set standard value unique to said position control device, calculate gain correction values to be applied to the two deviation signals in order to correct gain of the deviation signals in said servo circuit; and correcting means, which correct balance based on the balance correction values, or correct gain based on the gain correction values.

2. The position control device set forth in claim 1, further comprising:

a low-pass filter, which extracts from each of the digitized deviation signals a signal component which includes a direct-current component;

wherein said correction value calculating means include detecting means, which detect a level of each of the signal components from said low-pass filter a predetermined number of times, and said correction value calculating means calculate the balance correction values based on a mean value of all of the detected values.

3. The position control device set forth in claim 2, wherein:

said correction value calculating means obtain the mean value using only detected values within a predetermined range.

4. The position control device set forth in claim 2, wherein:

said correction value calculating means do not use a predetermined number of detected values immediately after commencement of detecting.

5. The position control device set forth in claim 1, wherein:

said difference signal producing means are provided between said correcting means and said optical pickup.

6. The position control device set forth in claim 1, further comprising:

a high-pass filter, which extracts from each of the digitized deviation signals a signal component which includes a high-frequency component;

wherein said difference signal producing means produce the difference signal by detecting a difference between the signal components from said high-pass filter.

7. The position control device set forth in claim 6, wherein:

said correction value calculating means include detecting means, which detect a level of the difference signal a predetermined number of times, and said correction value calculating means calculate the gain correction values based on a mean value of all of the detected values.

8. The position control device set forth in claim 7, wherein:

said correction value calculating means obtain the mean value using only detected values within a predetermined range.

9. The position control device set forth in claim 7, wherein:

said correction value calculating means do not use a predetermined number of detected values immediately after commencement of detecting.

10. The position control device set forth in claim 1, wherein:

said correction value calculating means set a threshold value, used for determining a timing with which light from said optical pickup crosses a track, in accordance with direct-current levels of the deviation signals; and said correction value calculating means include detecting means, which detect a level of the difference signal, which is necessary in calculating the gain correction values with the timing determined on the basis of the threshold value.

11. The position control device set forth in claim 10, wherein:

said detecting means determine an interval of each period of the difference signal by comparing the difference signal with the threshold value, and detect, a predetermined number of times, a level of the difference signal during each detecting period determined by the intervals; and said correction value calculating means calculate the gain correction values based on a mean value of all of the detected values.

12. The position control device set forth in claim 11, wherein:

said detecting means set as the threshold value two values, a positive value and a negative value, centered on zero level.

13. A position control device for an optical pickup which optically performs at least one of recording a signal in a track on a disk and reproducing a signal from a track on said disk, said position control device comprising:

a tracking servo circuit for performing tracking adjustment, based on two deviation signals corresponding to quantities of deviation from a centerline of a track toward either side thereof and a difference signal between the two deviation signals, such that light projected by said optical pickup follows the track;

digitizing means, which digitize the two deviation signals;

correction value calculating means, which, based on the digitized deviation signals, calculate offset correction values for correcting offset of the deviation signals and balance correction values for correcting balance between the deviation signals; and, based on the digitized deviation signals, the difference signals obtained from the two deviation signals, and a previously set standard value unique to said position control device, calculate gain correction values for correcting gain of the deviation signals in said tracking servo circuit; and correcting means which, based on the respective correction values, simultaneously correct offset, balance, and gain.

14. The position control device set forth in claim 13, further comprising:

light projection shutoff means, which turn off projection of light from said optical pickup;

wherein said correction value calculating means calculate the offset correction values when projection of light is turned off.

15. The position control device set forth in claim 13, further comprising:

a low-pass filter, which extracts from each of the digitized deviation signals a signal component which includes a direct-current component;

wherein said correction value calculating means calculate the offset correction values and balance correction values using the signal components from said low-pass filter.

16. The position control device set forth in claim 15, further comprising:

cutoff frequency changing means, which change a cutoff frequency of said low-pass filter according to whether the offset correction values or the balance correction values are to be calculated.

17. The position control device set forth in claim 16, wherein:

said low-pass filter is made of a digital signal processor.

18. The position control device set forth in claim 13, further comprising:

a low-pass filter, which extracts from each of the digitized deviation signals a signal component which includes a direct-current component;

wherein said correction value calculating means include detecting means, which detect a level of each of the signal components from said low-pass filter a predetermined number of times, and said correction value calculating means calculate the balance correction values based on a mean value of all of the detected values.

19. The position control device set forth in claim 18, wherein:

said correction value calculating means obtain the mean value using only detected values within a predetermined range.

20. The position control device set forth in claim 18, wherein:

said correction value calculating means do not use a predetermined number of detected values immediately after commencement of detecting.

21. The position control device set forth in claim 13, wherein:

said difference signal producing means are provided between said correcting means and said optical pickup.

22. The position control device set forth in claim 13, further comprising:

a high-pass filter, which extracts from each of the digitized deviation signals a signal component which includes a high-frequency component;

wherein said difference signal producing means produce the difference signal by detecting a difference between the signal components from said high-pass filter.

23. The position control device set forth in claim 22, wherein:

said correction value calculating means include detecting means, which detect a level of the difference signal a predetermined number of times, and said correction value calculating means calculate the gain correction values based on a mean value of all of the detected values.

24. The position control device set forth in claim 23, wherein:

said correction value calculating means obtain the mean value using only detected values within a predetermined range.

25. The position control device set forth in claim 23, wherein:

said correction value calculating means do not use a predetermined number of detected values immediately after commencement of detecting.

26. The position control device set forth in claim 13, wherein:

said correction value calculating means set a threshold value, used for determining a timing with which light from said optical pickup crosses a track, in accordance with direct-current levels of the deviation signals; and said correction value calculating means include detecting means, which detect a level of the difference signal, which is necessary in calculating the gain correction values with the timing determined on the basis of the threshold value.

27. The position control device set forth in claim 26, wherein:

said detecting means determine an interval of each period of the difference signal by comparing the difference signal with the threshold value, and detect, a predetermined number of times, a level of the difference signal during each detecting period determined by the intervals; and said correction value calculating means calculate the gain correction values based on a mean value of all of the detected values.

28. The position control device set forth in claim 27, wherein:

said detecting means set as the threshold value two values, a positive value and a negative value, centered on zero level.

29. The position control device set forth in claim 13, further comprising:

threshold value setting means, which set a threshold value, used for determining a timing with which light from said optical pickup crosses a track, in accordance with direct-current levels of the digitized deviation signals.

30. A position control device for an optical pickup which optically performs at least one of recording a signal in a track on a disk and reproducing a signal from a track on said disk, said position control device comprising:

a tracking servo circuit for performing tracking adjustment, based on two deviation signals corresponding to quantities of deviation from a centerline of a track toward either side thereof and a difference signal between the two deviation signals, such that light projected by said optical pickup follows the track;

digitizing means, which digitize the two deviation signals;

correction value calculating means, which, based on a comparison between the digitized deviation signals, calculate offset correction values for correcting offset of the deviation signals and balance correction values for correcting balance between the deviation signals; and correcting means which, based on the respective correction values, simultaneously correct offset and balance.

31. The position control device set forth in claim 30, further comprising:

light projection shutoff means, which turn off projection of light from said optical pickup;

wherein said correction value calculating means calculate the offset correction values when projection of light is turned off.

32. The position control device set forth in claim 30, further comprising:

a low-pass filter, which extracts from each of the digitized deviation signals a signal component which includes a direct-current component;

wherein said correction value calculating means calculate the offset correction values and balance correction values using the signal components from said low-pass filter.

33. The position control device set forth in claim 32, further comprising:

cutoff frequency changing means, which change a cutoff frequency of said low-pass filter according to whether the offset correction values or the balance correction values are to be calculated.

34. The position control device set forth in claim 33, wherein:

said low-pass filter is made of a digital signal processor.

35. The position control device set forth in claim 30, further comprising:

a low-pass filter, which extracts from each of the digitized deviation signals a signal component which includes a direct-current component;

wherein said correction value calculating means include detecting means, which detect a level of each of the signal components from said low-pass filter a predetermined number of times, and said correction value calculating means calculate the balance correction values based on a mean value of all of the detected values.

36. The position control device set forth in claim 35, wherein:

said correction value calculating means obtain the mean value using only detected values within a predetermined range.

37. The position control device set forth in claim 35, wherein:

said correction value calculating means do not use a predetermined number of detected values immediately after commencement of detecting.

38. The position control device set forth in claim 30, further comprising:

threshold value setting means, which set a threshold value, used for determining a timing with which light from said optical pickup crosses a track, in accordance with direct-current levels of the digitized deviation signals.

* * * * *